(12) United States Patent
Fujihashi et al.

(10) Patent No.: US 9,438,780 B2
(45) Date of Patent: Sep. 6, 2016

(54) IMAGE CAPTURE APPARATUS, ACCESSORY AND IMAGE CAPTURE SYSTEM

(75) Inventors: Naoto Fujihashi, Yokohama (JP); Yoshiro Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 13/590,754

(22) Filed: Aug. 21, 2012

(65) Prior Publication Data

US 2013/0050510 A1 Feb. 28, 2013

(30) Foreign Application Priority Data

Aug. 29, 2011 (JP) ................. 2011-186361

(51) Int. Cl.
| | |
|---|---|
| H04N 5/225 | (2006.01) |
| G03B 15/05 | (2006.01) |
| H04N 5/232 | (2006.01) |
| G03B 17/02 | (2006.01) |

(52) U.S. Cl.
CPC ............ *H04N 5/2256* (2013.01); *G03B 15/05* (2013.01); *G03B 17/02* (2013.01); *H04N 5/23203* (2013.01); *G03B 2206/00* (2013.01); *G03B 2215/056* (2013.01)

(58) Field of Classification Search
CPC ........... H04N 5/2256; H04N 5/23203; G03B 17/02; G03B 15/05; G03B 2215/056; G03B 2206/00
USPC .......................... 348/371, 349, 333.1; 396/56
See application file for complete search history.

(56) References Cited

U.S. PATENT DOCUMENTS

| | | | | |
|---|---|---|---|---|
| 5,481,326 A | * | 1/1996 | Yasukawa ................ | G03B 7/26 396/279 |
| 7,327,396 B2 | * | 2/2008 | Schultz et al. ................. | 348/375 |
| 2002/0009296 A1 | * | 1/2002 | Shaper et al. .................. | 396/56 |

(Continued)

FOREIGN PATENT DOCUMENTS

| | | |
|---|---|---|
| CN | 101464614 A | 6/2009 |
| JP | 01-287643 | 11/1989 |

(Continued)

OTHER PUBLICATIONS

Oct. 10, 2014 Chinese Office Action, that issued in Chinese Patent Application No. 201210313975.0.

(Continued)

*Primary Examiner* — Mekonnen Dagnew
(74) *Attorney, Agent, or Firm* — Cowan, Liebowitz & Latman, P.C.

(57) ABSTRACT

An image capture system includes an image capture apparatus and an accessory connected to the image capture apparatus. The accessory includes a signal terminal used to communicate with the image capture apparatus based on a voltage value or current value, an activation signal generation unit which generates an activation signal required to switch the image capture apparatus from an idle state to a non-idle state, and a control unit which controls to output the activation signal to the image capture apparatus via the signal terminal. The image capture apparatus includes a state change unit which changes a state of the image capture apparatus between the idle state and non-idle state. The state change unit changes the state of the image capture apparatus to the non-idle state upon acceptance of the activation signal via the signal terminal in the idle state.

19 Claims, 13 Drawing Sheets

(56) References Cited

U.S. PATENT DOCUMENTS

| | | | |
|---|---|---|---|
| 2003/0193571 A1* | 10/2003 | Schultz | H04N 5/23203 348/207.99 |
| 2006/0034606 A1* | 2/2006 | Haraldsson | G03B 7/26 396/541 |
| 2007/0070206 A1* | 3/2007 | Clark | 348/207.99 |
| 2008/0136960 A1* | 6/2008 | Kawakami | 348/371 |

FOREIGN PATENT DOCUMENTS

| | | |
|---|---|---|
| JP | 06-186619 A | 7/1994 |
| JP | 2005-538410 A | 12/2005 |

OTHER PUBLICATIONS

Jun. 26, 2015 Japanese Office Action, that issued in Japanese Patent Application No. 2011-186361.

* cited by examiner

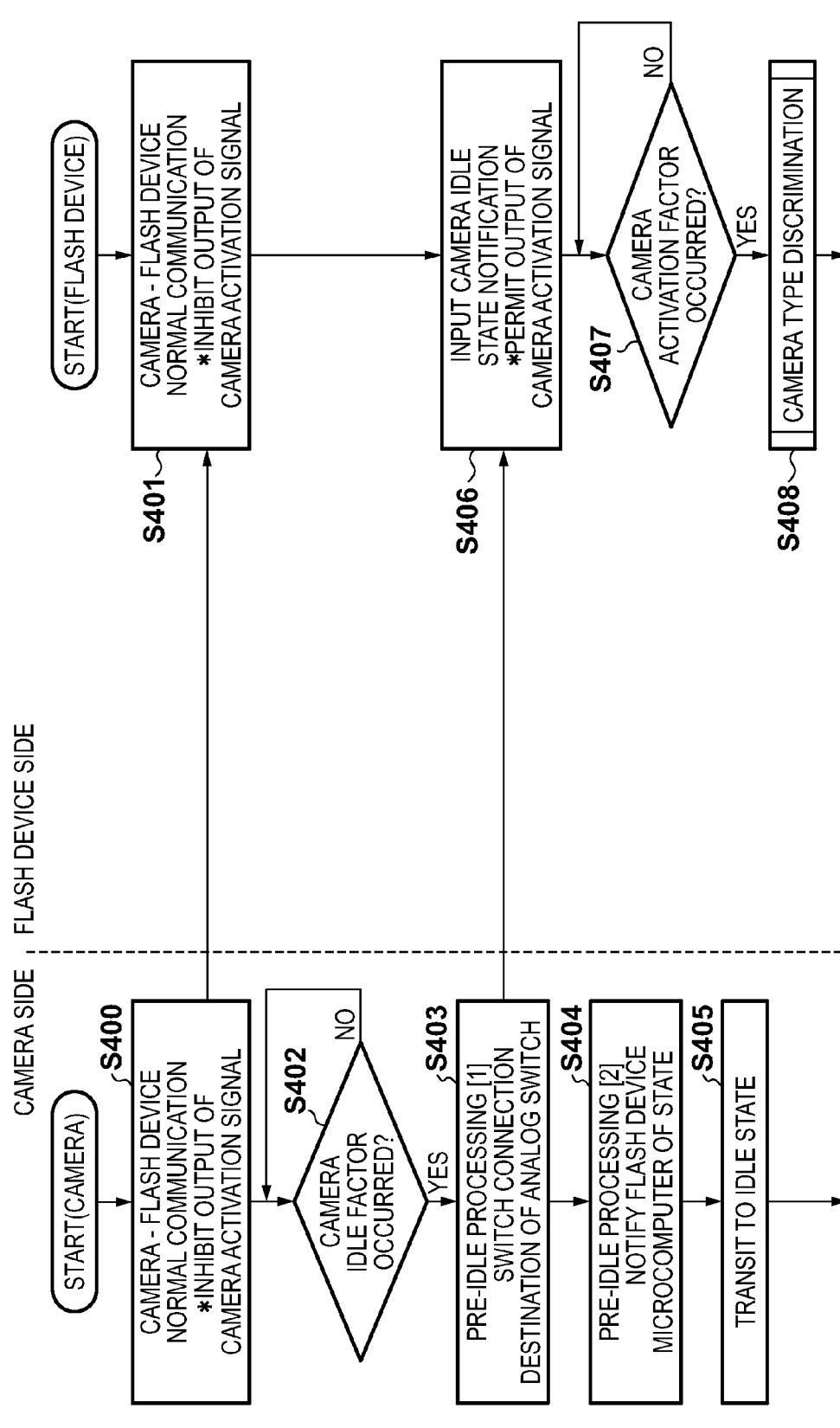

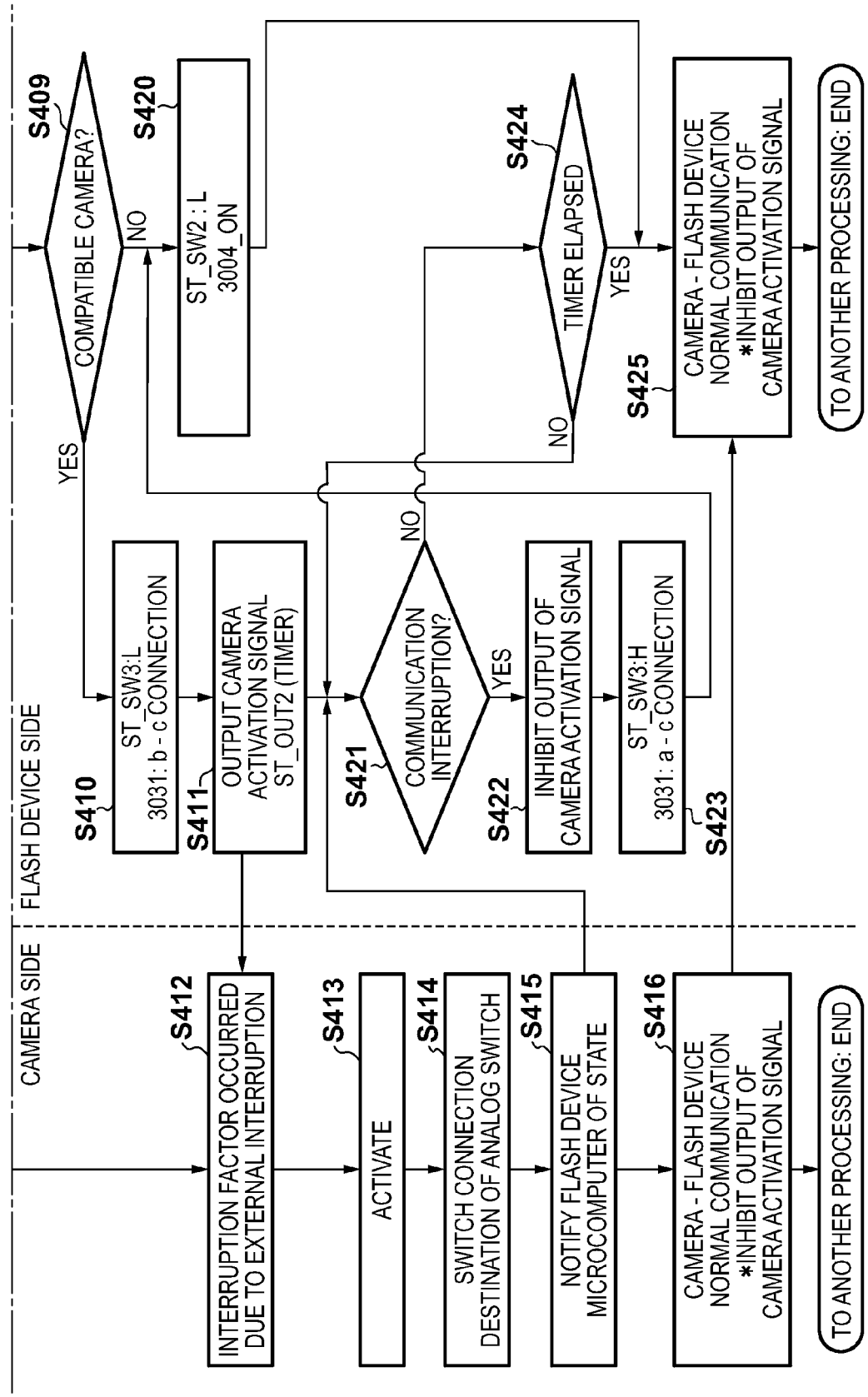

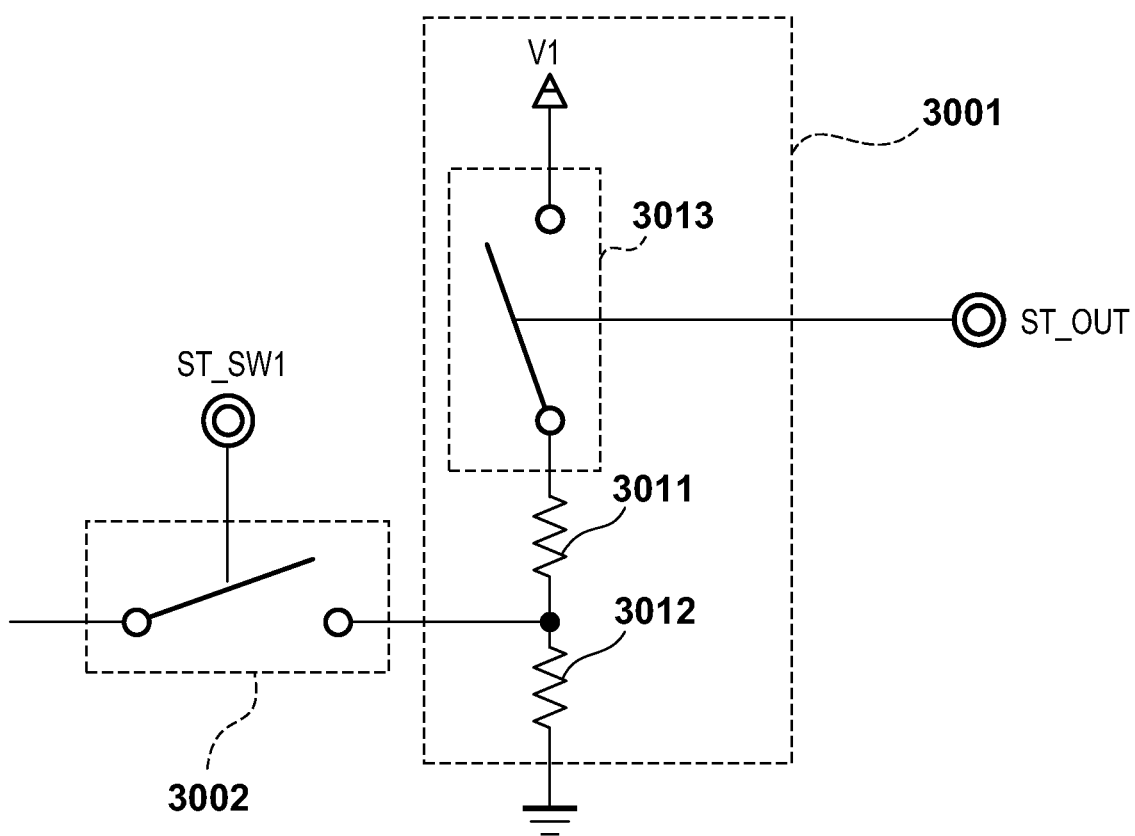
F I G. 10

IMAGE CAPTURE APPARATUS, ACCESSORY AND IMAGE CAPTURE SYSTEM

BACKGROUND OF THE INVENTION

1. Field of the Invention

The present invention relates to an image capture apparatus, an accessory connected to the image capture apparatus, and an image capture system in which the accessory is connected to the image capture apparatus.

2. Description of the Related Art

In general, an image capture apparatus such as a digital camera can connect an accessory such as a flash device. In order to control the connected flash device via an interface used to connect the image capture apparatus and flash device, a communication for transmitting a lighting instruction signal to the flash device can be made. However, when the image capture apparatus is inactive in a power saving mode, data cannot be exchanged between the image capture apparatus and flash device. Hence, in such case, even when the user mounts the flash device on the image capture apparatus and operates operation members on the flash device side, these operation contents are not reflected to the image capture apparatus.

Japanese Patent Laid-Open No. 1-287643 (to be referred to as literature 1 hereinafter) has proposed an arrangement which allows the flash device to activate the image capture apparatus in the power saving mode. According to literature 1, in the flash device, a circuit for transmitting an activation signal in synchronism with activation of the flash device is added to a connection terminal, which receives communication clock pulses from the image capture apparatus. Also, in the image capture apparatus, a circuit for receiving the activation signal from the flash device is added to a connection terminal, which outputs clock pulses to the flash device. That is, according to literature 1, the flash device transmits the activation signal to the image capture apparatus via the clock pulse terminals, and the image capture apparatus which received that signal is activated from an idle state in the power saving mode to a normal active state.

However, with the related art disclosed in literature 1 above, new circuits have to be added to the clock pulse terminals of the image capture apparatus and flash device, thus deteriorating the waveform of communication clocks and disturbing a high communication speed.

SUMMARY OF THE INVENTION

According to one embodiment, there is provided a camera system which allows a connected accessory to activate an image capture apparatus in an idle state without lowering communication quality between the image capture apparatus and connected accessory.

According to one aspect of the present invention, there is provided an accessory connectable to an image capture apparatus, comprising: a signal terminal which is electrically connected to a terminal provided to an accessory shoe of a connected image capture apparatus so as to communicate with the connected image capture apparatus, a signal level of a signal going through the signal terminal corresponding to information to be communicated via the signal terminal; an activation signal generation unit configured to generate an activation signal required to change the connected image capture apparatus from an idle state to a non-idle state; and a control unit configured to control to output the activation signal to the connected image capture apparatus via the signal terminal.

Also, according to one aspect of the present invention, there is provided an accessory connectable to an image capture apparatus, comprising: a serial communication signal terminal used to make a serial communication with a connected image capture apparatus; a signal terminal which is electrically connected to a terminal provided to an accessory shoe of the connected image capture apparatus, and is different from the serial communication signal terminal; an activation signal generation unit configured to generate an activation signal required to switch the connected image capture apparatus from a serial communication disabled state to a serial communication enabled state; and a control unit configured to control to output the activation signal to the connected image capture apparatus via the signal terminal.

Also, according to one aspect of the present invention, there is provided an image capture apparatus, which is connectable to an accessory comprising an activation signal generation unit which generates an activation signal required to switch a connected image capture apparatus from an idle state to a non-idle state, the apparatus comprising: a signal terminal which is provided to an accessory shoe and is used to communicate with a connected accessory, a signal level of a signal going through the signal terminal corresponding to information to be communicated via the signal terminal; and a state change unit configured to change a state of the image capture apparatus between the idle state and the non-idle state, wherein the state change unit changes the state of the image capture apparatus to the non-idle state when the activation signal is accepted via the signal terminal in the idle state.

Also, according to one aspect of the present invention, there is provided an image capture apparatus connectable to an accessory, comprising: a serial communication signal terminal used to make a serial communication with a connected accessory; a signal terminal which is provided to an accessory shoe and is different from the serial communication signal terminal; and a state change unit configured to change a state of the image capture apparatus between a serial communication disabled state and a serial communication enabled state, wherein when the state change unit accepts, via the signal terminal, an activation signal, which is generated by the accessory and is required to change the state of the image capture apparatus from the serial communication disabled state to the serial communication enabled state, in the serial communication disabled state, the state change unit changes the state of the image capture apparatus to the serial communication enabled state.

Also, according to one aspect of the present invention, there is provided an image capture system comprising: an image capture apparatus; and an accessory connectable to the image capture apparatus, the accessory comprising: a signal terminal which is electrically connected to a terminal provided to an accessory shoe of the image capture apparatus so as to communicate with the image capture apparatus, a signal level of a signal going through the signal terminal corresponding to information to be communicated via the signal terminal; an activation signal generation unit configured to generate an activation signal required to change the image capture apparatus from an idle state to a non-idle state; and a control unit configured to control to output the activation signal to the image capture apparatus via the signal terminal, and the image capture apparatus comprising: a state change unit configured to change a state of the image capture apparatus between the idle state and the non-idle state, wherein the state change unit changes the state of the image capture apparatus to the non-idle state when the activation signal is accepted via the signal terminal in the idle state.

Furthermore, according to one aspect of the present invention, there is provided an image capture system comprising: an image capture apparatus; and an accessory connectable to the image capture apparatus, the accessory comprising: a serial communication signal terminal used to make a serial communication with the image capture apparatus; a signal terminal which is electrically connected to a terminal provided to an accessory shoe of the image capture apparatus, and is different from the serial communication signal terminal; an activation signal generation unit configured to generate an activation signal required to switch the image capture apparatus from a serial communication disabled state to a serial communication enabled state; and a control unit configured to control to output the activation signal to the image capture apparatus via the signal terminal, and the image capture apparatus comprising: a state change unit configured to change a state of the image capture apparatus between a serial communication disabled state and a serial communication enabled state, wherein when the state change unit accepts the activation signal via the signal terminal in the serial communication disabled state, the state change unit changes the state of the image capture apparatus to the serial communication enabled state.

Further features of the present invention will become apparent from the following description of exemplary embodiments with reference to the attached drawings.

BRIEF DESCRIPTION OF THE DRAWINGS

FIGS. 7A and 7B are flowcharts for explaining the cooperation between the camera and flash device;

FIG. 10 is a circuit diagram showing an example of a camera determination output circuit in the flash device;

DESCRIPTION OF THE EMBODIMENTS

Preferred embodiments of the present invention will be described in detail hereinafter with reference to the accompanying drawings.

Figure 1:
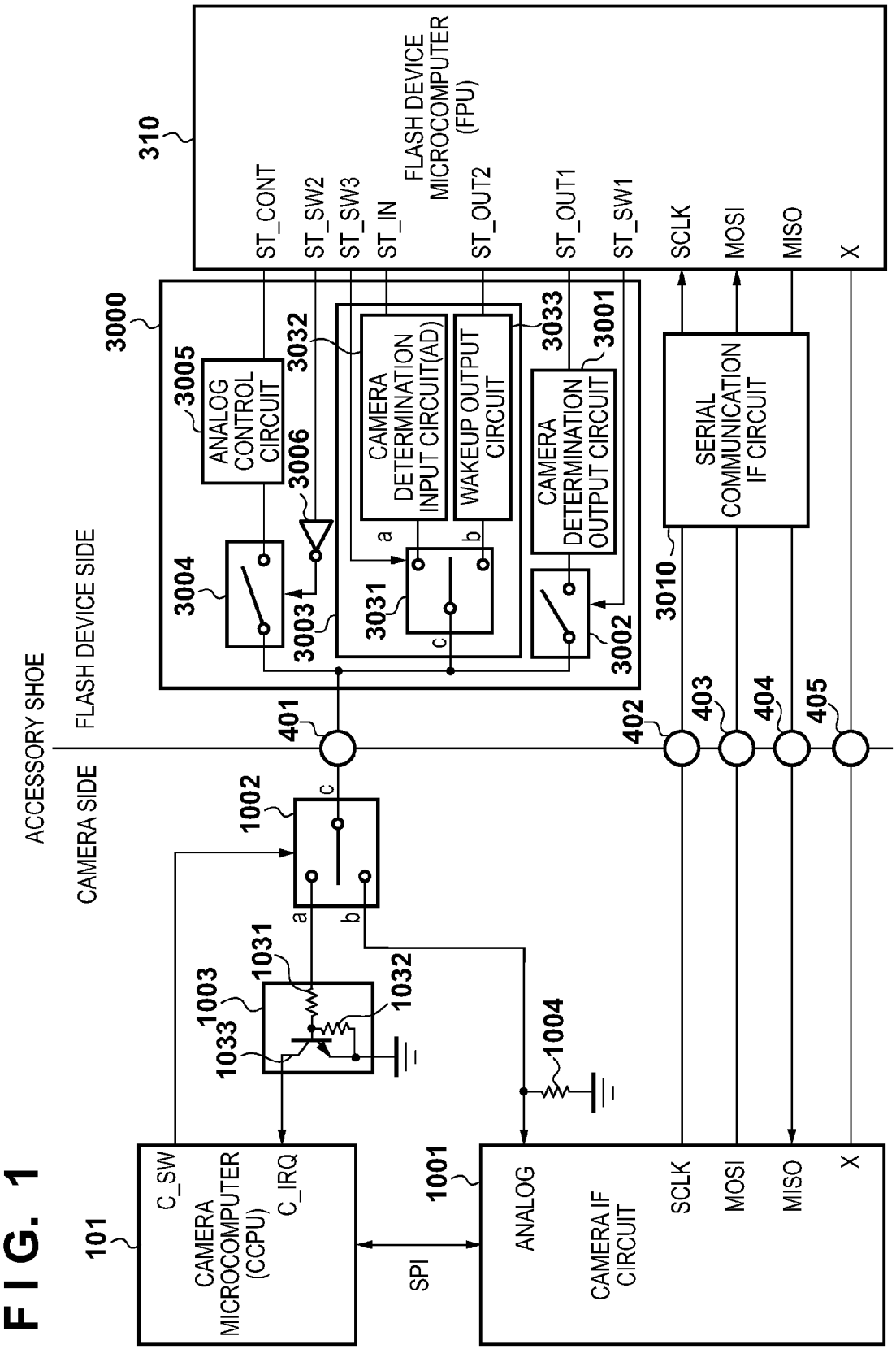
FIG. 1 is a block diagram showing the circuit arrangement in an accessory shoe according to an embodiment.
Figure 2:
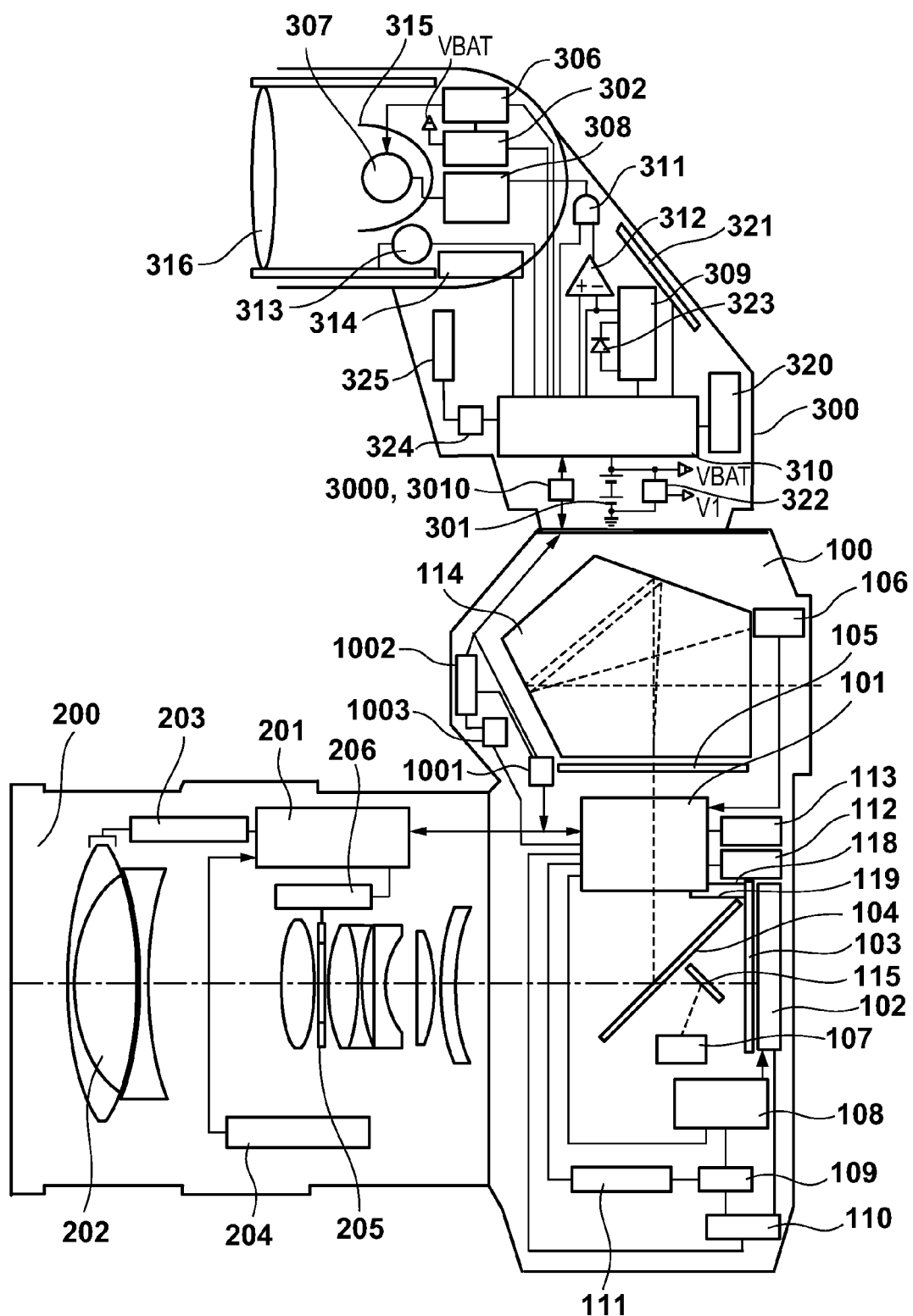
FIG. 2 is a block diagram showing an overall camera system according to the embodiment.

FIG. 1 is a block diagram extracting and showing the arrangement associated with an interface (accessory shoe) required to connect a camera as an image capture apparatus according to this embodiment, and a flash device as an accessory connectable to the image capture apparatus. FIG. 2 is a block diagram showing the overall arrangement of an image capture system (camera and flash device) according to the embodiment.

The arrangement of the image capture system (including a digital camera, lens, and flash device) according to the embodiment will be described first with reference to FIG. 2. Referring to FIG. 2, reference numeral 100 denotes a camera main body; 200, a lens; and 300, a flash device (lighting device). The arrangement in the camera 100 will be described first.

A camera microcomputer 101 is a microcomputer CPU which controls respective units of the camera 100. The camera microcomputer 101 has a microcomputer-incorporated one-chip IC configuration. For example, the camera microcomputer 101 includes a CPU, ROM, RAM, input/output (I/O) control circuit, multiplexer, timer circuit, EEPROM (electrically erasable/writable ROM), A/D converter, D/A converter, and the like. The camera microcomputer 101 implements various kinds of control and various kinds of conditional determination of the camera system by executing software. The camera microcomputer 101 is driven by clocks generated by an internal or externally connected oscillation circuit, and attains accurate time management by counting these clocks. Thus, the camera microcomputer 101 controls timings in an operation sequence of the overall camera and those in a communication sequence with an external flash device, remote controller, and the like.

An imaging device 102 includes an infrared cut filter, low-pass filter, and the like, and is configured by an element such as a CCD or CMOS. On the imaging device 102, an image of an object is formed by a lens group 202 (to be described later) at an imaging timing. A shutter 103 includes a control circuit, is closed at a non-imaging timing to shield light to be incident on the imaging device 102, and is opened at an imaging timing to guide light onto the imaging device 102. The control circuit of the shutter 103 controls the shutter according to shutter driving signals 118 (shutter front curtain driving signal, shutter rear curtain driving signal) from the camera microcomputer 101. In this embodiment, the shutter 103 is a known focal-plane shutter. The control circuit of the shutter 103 controls two shutter driving magnets included in the focal-plane shutter to travel the shutter front and rear curtains, thereby assuming an exposure operation. The shutter 103 incorporates a known photointerrupter to detect positions of blades, a shutter traveling completion timing, and the like, and transmits the detection results to the camera microcomputer 101 as detection signals 119.

A time period from when the shutter front curtain driving signal is output until traveling of the shutter curtain is complete in practice suffers variations caused by the number of operation times, temperature/orientation differences, and the like. A storage device (EEPROM or the like) in the camera microcomputer 101 pre-stores correction values for variations of the operation of the front curtain.

A main mirror 104 (half mirror) reflects some light rays coming from the lens group 202 and images them on a focusing plate 105 at a non-imaging timing. The focusing plate 105 is used to allow the user to visually confirm a focus via an optical viewfinder (not shown). A photometry circuit 106 measures an object luminance value. A photometry sensor in the photometry circuit 106 divides an imaging range of an object into a plurality of areas, and executes photometry on the respective areas. A focus detection circuit 107 has a distance measurement sensor having a plurality of points as distance measurement points, and is configured so that the distance measurement points are included at positions corresponding to the divided areas of the photometry sensor. Note that the photometry sensor in the photometry circuit 106 observes an object image formed on the focusing plate 105 via a pentagonal prism 114. A gain switching circuit 108 switches an amplification gain of a signal from the imaging device 102. The camera microcomputer 101 executes gain switching control of the gain switching circuit 108 based on imaging conditions, level settings in charging voltage conditions (to be described later), inputs from the user, and the like.

An A/D converter 109 converts an amplified analog signal from the imaging device 102 into a digital signal. A timing generator (TG) 110 synchronizes the input timing of the amplified signal of the imaging device 102 and the conversion timing of the A/D converter 109. A digital signal processing circuit 111 applies image processing according to parameters to image data, which is converted into the digital signal by the A/D converter 109. Note that a memory and the like required to store processed images are not shown. Reference symbol SC denotes a signal line of interfaces of the camera 100, lens 200, and flash device 300, and the signal line SC is used to allow them to exchange data and commands with each other to have, for example, the camera microcomputer 101 as a host.

A camera IF circuit 1001 is an interface between the camera 100 and flash device 300, and is a circuit required to make camera-flash device communications (to be described later with reference to FIG. 1). The camera IF circuit 1001 has a lighting signal terminal to the flash device 300 and a communication clock terminal with a flash microcomputer 310, and allows communications between the camera microcomputer 101 and flash microcomputer 310.

An interruption generating circuit 1003 generates an interruption signal required to activate the camera in response to an activation signal from the flash device 300 after occurrence of a camera idle factor. The interruption generating circuit 1003 is connected to the camera microcomputer 101, and also to an analog switch 1002. The analog switch 1002 switches to which of the interruption generating circuit 1003 and an ANALOG terminal of the camera IF circuit 1001 an analog signal terminal 401 (FIG. 1) of the accessory shoe is connected. Details will be described later with reference to FIG. 1.

The camera 100 has an interface with a lens microcomputer 201, which allows data communications between the camera microcomputer 101 and lens microcomputer 201. Furthermore, the camera 100 has an input unit 112 which allows the user to make various inputs. The input unit 112 has switches, buttons, dials, and the like used to make setting operations for the camera 100 and flash devices 300, a preliminary lighting instruction operation, and an instruction operation for a fill-in flash mode or the like. A display unit 113 displays various set modes, and other kinds of imaging information. The display unit 113 includes, for example, a liquid crystal device, light-emitting elements, and the like. The pentagonal prism 114 guides an object image on the focusing plate 105 to the photometry sensor in the photometry circuit 106 and an optical viewfinder (not shown). A sub mirror 115 guides light which comes from the lens group 202 and is transmitted through the main mirror 104 to the distance measurement sensor of the focus detection circuit 107.

The arrangement and operation in the lens 200 will be described below. The lens microcomputer 201 is a microcomputer LPU, which controls the operations of respective units in the lens 200. The lens microcomputer 201 has a microcomputer-incorporated one-chip IC circuit configuration. For example, the lens microcomputer 201 includes a CPU, ROM, RAM, input/output (I/O) control circuit, multiplexer, timer circuit, EEPROM (electrically erasable/writable ROM), A/D converter, D/A converter, and the like.

The lens group 202 includes a plurality of lenses. A lens driving unit 203 moves a focal point position adjustment optical system of the lens group 202. A driving amount of the lens group 202 is calculated by the camera microcomputer 101 based on the output from the focus detection circuit 107 included in the camera 100, and is provided to the lens microcomputer 201. An encoder 204 detects a position at the time of driving of the lens group 202. The lens microcomputer 201 operates the lens driving unit 203 by the calculated driving amount using driving information of the encoder 204, thereby moving the lens group 202 to an in-focus position. A stop 205 is controlled by the lens microcomputer 201 via a stop control circuit 206. Note that the focal length of the lens group 202 may be that for a single focus (fixed) or variable like a zoom lens.

The arrangement of the flash device 300 will be described below. The flash microcomputer 310 is a microcomputer FPU which controls the operations of respective units of the flash device 300. The flash microcomputer 310 has a microcomputer-incorporated one-chip IC configuration. For example, the flash microcomputer 310 includes a CPU, ROM, RAM, input/output (I/O) control circuit, multiplexer, timer circuit, EEPROM (electrically erasable/writable ROM), A/D converter, D/A converter, and the like.

An analog IF circuit 3000 and serial communication IF circuit 3010 are interfaces between the camera 100 and flash device 300. The analog IF circuit 3000 and serial communication IF circuit 3010 are used to connect a plurality of signals from the camera 100 to the flash microcomputer 310, and details thereof will be described later with reference to FIG. 1.

A battery 301 is a power supply (VBAT) of the flash device 300, and is connected to a booster circuit 302 and the flash microcomputer 310. The booster circuit 302 controls a main capacitor (not shown) to accumulate an energy required to cause a discharge tube 307 to emit light by boosting a voltage of the battery 301 to several hundred V under the control of the flash microcomputer 310. Note that the main capacitor is a high-voltage capacitor required for flash lighting. In this embodiment, a voltage is charged up to 330 V, and is discharged in response to a lighting trigger. A voltage detection circuit (not shown) used to detect a main capacitor voltage is connected across the two terminals of the main capacitor. A voltage charged on the main capacitor is voltage-divided by the voltage detection circuit, and the divided voltage is input to an A/D conversion terminal of the flash microcomputer 310. This information is transmitted from the flash microcomputer 310 to the camera microcomputer 101 via an SC communication.

A trigger circuit 306 outputs trigger signal pulses in response to a lighting instruction from the flash microcomputer 310. The discharge tube 307 as a lighting unit emits light by exciting the energy charged on the main capacitor by receiving a pulse voltage of several kV applied from the trigger circuit 306, and irradiates an object with that light. A lighting control circuit 308 controls start of lighting of the discharge tube 307 together with the trigger circuit 306, and also controls stop of lighting. A photodiode 323 is a sensor which receives a lighting amount of the discharge tube 307, and receives light from the discharge tube 307 directly or via a glass fiber or the like. An integration circuit 309 integrates a received photocurrent of the photodiode 323. Upon reception of an integration start signal from the flash microcomputer 310, the integration circuit 309 outputs the integration result to an inverting input terminal of a comparator 312 and the A/D converter terminal of the flash microcomputer 310.

A non-inverting input terminal of the comparator 312 is connected to a D/A converter output terminal of the flash microcomputer 310, and an output terminal of the comparator 312 is connected to one input terminal of an AND gate 311. The other input terminal of the AND gate 311 is connected to a lighting control terminal of the flash microcomputer 310, and the output of the AND gate 311 is input to the lighting control circuit 308. The discharge tube 307 is arranged to be surrounded by a reflector 315. An optical system 316 includes a panel and the like, and is used to decide an illumination angle of the flash device 300. An input unit 320 is an input interface connected to the flash microcomputer 310, accepts various user's operation inputs, and transmits them to the flash microcomputer 310. The input unit 320 includes switches arranged on, for example, the side surface of the flash device 300, and allows the user to manually input flash information. A switch used to generate a camera activation factor of this embodiment and to activate the camera in an idle state is also included in the input unit 320. A display unit 321 displays respective states of the flash device 300 under the control of the flash microcomputer 310.

A constant voltage circuit 322 controls the voltage of the battery 301 to a predetermined voltage (V1), and outputs the controlled voltage. As described above, the integration circuit 309 integrates the received photocurrent of the photodiode 323. A known wireless communication circuit 324 and wireless antenna 325 exchange data with camera accessories such as an external flash device, remote controller, and the like using radio waves. The wireless communication circuit 324 is connected to the flash microcomputer 310, and instructs, analyzes, and judges signals to be transmitted and received by the flash microcomputer 310. For example, wireless communication packets generated by the flash microcomputer 310 are exchanged with, for example, a flash device 300-2 shown in FIG. 11 via the wireless communication circuit 324 and wireless antenna 325. A motor driving circuit 313 controls an illumination angle of the flash device 300 by driving the optical system 316. An encoder 314 detects a position of the optical system 316 in an illumination direction of light by the discharge tube 307, thus controlling the illumination angle of the flash device based on the detection result.

[Camera Unit]

FIG. 1 is a block diagram showing the arrangement associated with an accessory shoe portion of the camera 100 according to this embodiment, that is, an interface between the camera 100 and flash device 300. As described above, the camera microcomputer 101 is a central processing unit which controls the overall functions of the camera 100. The camera microcomputer 101 has a C_SW terminal which outputs a signal required to control the analog switch 1002 (to be described later) and a C_IRQ terminal which accepts an interruption signal from the interruption generating circuit 1003 (to be described later). The camera microcomputer 101 and flash microcomputer 310 have a peripheral communication function, and communicate with each other via the camera IF circuit 1001 and serial communication IF circuit 3010. The camera microcomputer 101 includes an interruption input function by an external signal, and activates the camera 100 from an idle state to change a state of the camera 100 to an active state when an interruption factor occurs in response to an interruption input signal C_IRQ. In the idle state, the camera microcomputer 101 does not accept any communication request from the flash microcomputer 310 of the flash device. In the active state (non-idle state), the camera microcomputer accepts a communication request from the flash microcomputer 310 of the flash device. Assume that when a predetermined condition is satisfied in a power saving mode, the camera microcomputer 101 transits to the idle state.

In this case, the flash microcomputer 310 of the flash device 300 can start a communication with the camera microcomputer 101 only when the flash microcomputer 310 recognizes that the camera microcomputer 101 is active (in the active state). That is, when the camera microcomputer 101 notifies the flash microcomputer 310 of the operation end of the camera microcomputer 101, the flash microcomputer 310 recognizes that the camera microcomputer 101 is in the idle state, and inhibits communications to the camera microcomputer 101. Alternatively, after the camera 100 and flash device 300 are connected, when the camera microcomputer 101 and flash microcomputer 310 have never communicated with each other, communications from the flash microcomputer 310 to the camera microcomputer 101 are inhibited.

In a communication system of the camera 100 and flash device 300 with the aforementioned restrictions, the camera microcomputer 101 in the idle state cannot be activated by a communication from the flash microcomputer 310. For this reason, this embodiment allows the flash microcomputer 310 to activate the camera microcomputer 101 in the idle state using a signal line which goes through the analog signal terminal 401 (to be described later). The analog signal terminal 401 is a state detection terminal used to output an analog signal from the camera 100 to the flash device 300 or vice versa so as to allow at least one of the camera 100 and flash device 300 to recognize each other's states. Note that the analog signal is a signal as a voltage value or current value itself which has a meaning, and a signal level of the analog signal corresponds to information to be communicated via the analog signal terminal 401. Also, the analog signal terminal 401 is a signal terminal required to make a communication between the camera 100 and flash device 300 based on a voltage value or current value. For example, when the camera 100 outputs a voltage of x [v] to the flash device 300 via the analog signal terminal 401, the flash device 300 recognizes that the camera 100 is in a release preparation completion state (imaging preparation completion state). Also, a notification from the flash device 300 to the camera 100 includes that indicating charge completion in the flash device 300 (the discharge tube 307 is ready to emit light).

The camera IF circuit 1001 is an interface between the camera 100 and flash device 300, and realizes a communication between the camera microcomputer 101 and flash device 300 by executing level conversion and the like of a serial communication. Accessory shoe terminals used to connect SC signals as communications between the camera 100 and flash device 300 include the analog signal terminal 401, an SCLK terminal 402, an MOSI terminal 403, an MISO terminal 404, and an X terminal 405. Note that FIG. 1 shows the analog signal terminal 401, SCLK terminal 402, MOSI terminal 403, MISO terminal 404, and X terminal 405 each by one. However, in practice, respective accessory shoe terminals are respectively provided to the camera 100 and flash device 300 sides. In FIG. 1, in order to express a state in which the accessory shoe terminals on the camera 100 side and those on the flash device 300 side are electrically connected, the respective accessory shoe terminals are described each by one. For example, the analog signal terminal on the camera 100 side is a terminal included in the accessory shoe of the camera 100, and the analog signal terminal on the flash device 300 side is a terminal electrically connected to the analog signal terminal included in the accessory shoe of the camera 100. The analog signal terminal 401 is a terminal which allows the camera to execute analog control for the flash device 300, and is used to execute flash AF auxiliary lighting control and charging completion control in conventional camera operations. In this embodiment, the analog signal terminal 401 is used to activate the camera from the camera idle state to the camera active state depending on a condition. For this reason, in the camera idle state, charging completion is not notified via the analog signal terminal 401. The SCLK terminal 402 is a clock terminal used to transmit clocks used in a serial communication. The MOSI terminal 403 is a terminal used to transmit information from the camera 100 to the flash device 300 in a serial communication. The MISO terminal 404 is a terminal used to transmit information from the flash device 300 to the camera 100 in a serial communication. The X terminal 405 is a lighting signal terminal used to transmit a synchro timing (lighting instruction signal) from the camera 100.

The camera IF circuit 1001 controls the flash device 300 using the three serial communication signal terminals, that is, the SCLK terminal 402, MOSI terminal 403, and MISO terminal 404 required for the serial communication control. The camera IF circuit 1001 and camera microcomputer 101 are connected via an existing serial communication SPI, and the camera IF circuit 1001 executes level conversion and the like of the serial communication SPI from the camera microcomputer 101. The camera IF circuit 1001 makes a serial communication with the flash microcomputer 310 via the SCLK terminal 402, MOSI terminal 403, and MISO terminal 404.

The camera IF circuit 1001 has an ANALOG terminal used to input an analog signal. The ANALOG terminal is pulled down by a pull-down resistor 1004. This pull-down resistor 1004 is used to discriminate whether or not the connected camera is a camera which can be woken up by this embodiment (to be referred to as a compatible camera hereinafter) (details will be described later). The ANALOG terminal of the camera IF circuit 1001 is connected to the analog signal terminal 401 via the pull-down resistor 1004 and analog switch 1002. The analog signal terminal 401 is connected to the analog IF circuit 3000 of the flash device 300. The analog switch 1002 has a control terminal, and only one of two routes (a-c or b-c) is connected depending on whether a control signal input from the control terminal is at H or L level.

The C_SW terminal of the camera microcomputer 101 is connected to the control terminal of the analog switch 1002 to output a voltage of H or L level. In this embodiment, when the control terminal of the analog switch 1002 is at L level, the analog switch 1002 connects between a-c, and the interruption generating circuit 1003 (signal inverting circuit) is connected to the analog signal terminal 401. On the other hand, when the control terminal of the analog switch 1002 is at H level, the analog switch 1002 connects between b-c, and the ANALOG terminal of the camera IF circuit 1001 is connected to the analog signal terminal 401. Note that the logics of the control terminal of the analog switch 1002 may be reversed.

A method of allowing one of the camera IF circuit 1001 and interruption generating circuit 1003 to enable a signal via the analog signal terminal 401 may be other than the method of switching the connection destination of the analog signal terminal 401 by the analog switch 1002.

The interruption generating circuit 1003 forms a signal inverting circuit. The interruption generating circuit 1003 has an NPN transistor 1033, a resistor 1031 connected to the base of the NPN transistor 1033, and a resistor 1032 connected across the base and emitter. Note that a combined resistance of the resistors 1031 and 1032 is a resistor used in discrimination as to whether or not a compatible camera is connected (details will be described later).

[Flash Device Side]

As described above using FIG. 2, the flash microcomputer 310 is a central processing unit which controls the overall functions of the flash device 300. The flash microcomputer 310 has a peripheral communication function, and mutually communicates with the camera microcomputer 101 via the serial communication IF circuit 3010 of the flash device 300 and the camera IF circuit 1001. When the camera microcomputer 101 notifies the flash microcomputer 310 of the operation end of the camera microcomputer 101, the flash microcomputer 310 of the flash device 300 recognizes that the camera microcomputer 101 is in the idle state, and inhibits communications to the camera microcomputer. Alternatively, after the camera 100 and flash device 300 are connected, when the camera microcomputer 101 and the flash microcomputer 310 of the flash device have never communicate with each other, the flash microcomputer 310 of the flash device 300 similarly inhibits communications to the camera 100.

The analog IF circuit 3000 has an arrangement to be described below. A camera determination output circuit 3001 executes determination signal generation processing for generating and outputting a determination signal used to discriminate whether or not the connected camera is a specific camera (compatible camera) compatible with a returning operation from the camera idle state according to this embodiment. The camera determination output circuit 3001 is connected to an ST_OUT1 terminal of the flash microcomputer 310, outputs the determination signal when H level is output to the ST_OUT1 signal, and stops the determination signal when L level is output. The camera determination output circuit 3001 can have an arrangement shown in, for example, FIG. 10. That is, the camera determination output circuit 3001 is a circuit which outputs a constant voltage output obtained by voltage-dividing a voltage V1 of a constant voltage power supply by resistors 3011 and 3012 as the determination signal. A control terminal of an analog switch 3013 is connected to the ST_OUT1 terminal of the flash microcomputer 310, and it is set in a connected state when H level is input to the control terminal of the analog switch 3013; it is set in an open state when L level is input. In this manner, the analog switch 3013 sets ON/OFF of the output of the determination signal by the camera determination output circuit 3001.

A control terminal of an analog switch 3002 is connected to an ST_SW1 terminal of the flash microcomputer 310, and the analog switch 3002 is set in a connected state when H level is input to the control terminal, and is set in an open state when L level is input. One terminal of the analog switch 3002 is connected to the analog signal terminal 401, and the other terminal is connected to the camera determination output circuit 3001. Therefore, when H level is input to the control terminal of the analog switch 3002, the analog signal terminal 401 is connected to the camera determination output circuit 3001.

An activation circuit 3003 has a camera determination input circuit 3032 (AD conversion) which is used to discriminate whether or not a compatible camera, which is activated from the camera idle state to the camera active state, is connected, and a wakeup output circuit 3033 which makes an activation output of the camera. The activation circuit 3003 also includes an analog switch 3031 used to switch the connection with the analog signal terminal 401. The analog switch 3031 has a control terminal, and its connected state is decided based on whether a potential of H or L level is input to the control terminal. To the control terminal of the analog switch 3031, an ST_SW3 terminal of the flash microcomputer 310 is connected.

In this embodiment, when the control terminal (ST_SW3 terminal) of the analog switch 3031 is at L level, the analog switch 3031 sets b-c in a connected state, thus connecting the wakeup output circuit 3033 and analog signal terminal 401. When the control terminal (ST_SW3 terminal) of the analog switch 3031 is at H level, the analog switch 3031 sets a-c in a connected state, thus connecting the camera determination input circuit (AD conversion) 3032 and analog signal terminal 401. Note that the logics of the ST_SW3 terminal may be reversed.

The activation circuit 3003 may switch the camera determination input circuit 3032 and wakeup output circuit 3033 inside the flash microcomputer 310, and the switching method may be implemented by firmware. The camera determination input circuit 3032 detects a voltage drop due to a load upon connection of the camera when an output voltage of the camera determination output circuit 3001 is connected to the analog signal terminal 401 via the analog switch 3002. The camera determination input circuit 3032 is connected to an ST_IN terminal of the flash microcomputer 310. The flash microcomputer 310 discriminates based on the detected voltage drop value whether or not the connected camera is a compatible camera.

For example, the camera determination input circuit 3032 has Vaout as a discrimination voltage level, and determines the compatible camera when the voltage drop assumes a value less than Vaout or an incompatible camera otherwise. As will be described later, the above discrimination can be attained since the voltage drop due to the load upon connection of the camera has different settings depending on camera types such as compatible and incompatible cameras. The wakeup output circuit 3033 is connected to an ST_OUT2 terminal of the flash microcomputer 310. The wakeup output circuit 3033 outputs an H-level signal (activation signal) for a predetermined period based on an internal timer of the flash microcomputer 310. In this manner, the flash microcomputer 310 and wakeup output circuit 3033 execute activation signal generation processing for generating a signal which activates the camera 100 in the idle state to the active state. The activation signal is supplied to the interruption generating circuit 1003 of the camera 100 via the analog signal terminal 401, thus generating and outputting an interruption signal to the camera microcomputer 101.

An analog switch 3004 connects an analog control circuit 3005 and the analog signal terminal 401. A control terminal of the analog switch 3004 is connected to an ST_SW2 terminal of the flash microcomputer 310 via an inverter circuit 3006. The analog switch 3004 is set in a connected state when H level is input to the control terminal, and is set in an open state when L level is input. When the analog switch 3004 is set in the connected state, the analog signal terminal 401 and analog control circuit 3005 are connected. The analog control circuit 3005 is connected to an ST_CONT terminal of the flash microcomputer 310, and executes AF auxiliary lighting control and charging completion control of the flash device by exchanging signals with the camera 100 via the analog signal terminal 401. That is, the analog control circuit 3005 functions as a communication unit which communicates with the camera 100 by applying a voltage or current to a signal terminal (analog signal terminal 401).

The input side of the inverter circuit 3006 is connected to the ST_SW2 terminal of the flash microcomputer 310, and the output side is connected to the control terminal of the analog switch 3004. When the ST_SW2 terminal is at H level, since the output of the inverter circuit 3006 goes L, the analog switch 3004 is opened not to connect the analog signal terminal 401 and analog control circuit 3005. On the other hand, when the ST_SW2 terminal is at L level, since the output of the inverter circuit 3006 goes H, the analog switch 3004 is set in the connected state, and the analog signal terminal 401 and analog control circuit 3005 are connected. Note that the logics of the ST_SW2 terminal may be reversed.

The serial communication IF circuit 3010 controls, for example, a 3-wire serial communication. The serial communication IF circuit 3010 applies level conversion and the like to synchronization clocks input from the camera IF circuit 1001 via the SCLK terminal 402, and supplies the converted clocks to the SCLK terminal of the flash microcomputer 310. The serial communication IF circuit 3010 applies level conversion and the like to an MOSI terminal signal (camera information) input from the camera IF circuit 1001 via the MOSI terminal 403, and supplies the converted signal to the MOSI terminal of the flash microcomputer 310.

The serial communication IF circuit 3010 applies level conversion and the like to a signal output from the MISO terminal of the flash microcomputer 310, and outputs the converted signal (flash information or the like) to the MISO terminal of the camera IF circuit 1001 via the MISO terminal 404. Note that this example has explained the 3-wire serial communication. However, the present invention is not limited to this and, for example, a 2-wire serial communication may be adopted. The flash microcomputer 310 executes lighting based on a lighting instruction signal input from the X terminal.

(Description of Flowcharts)

Figure 3:
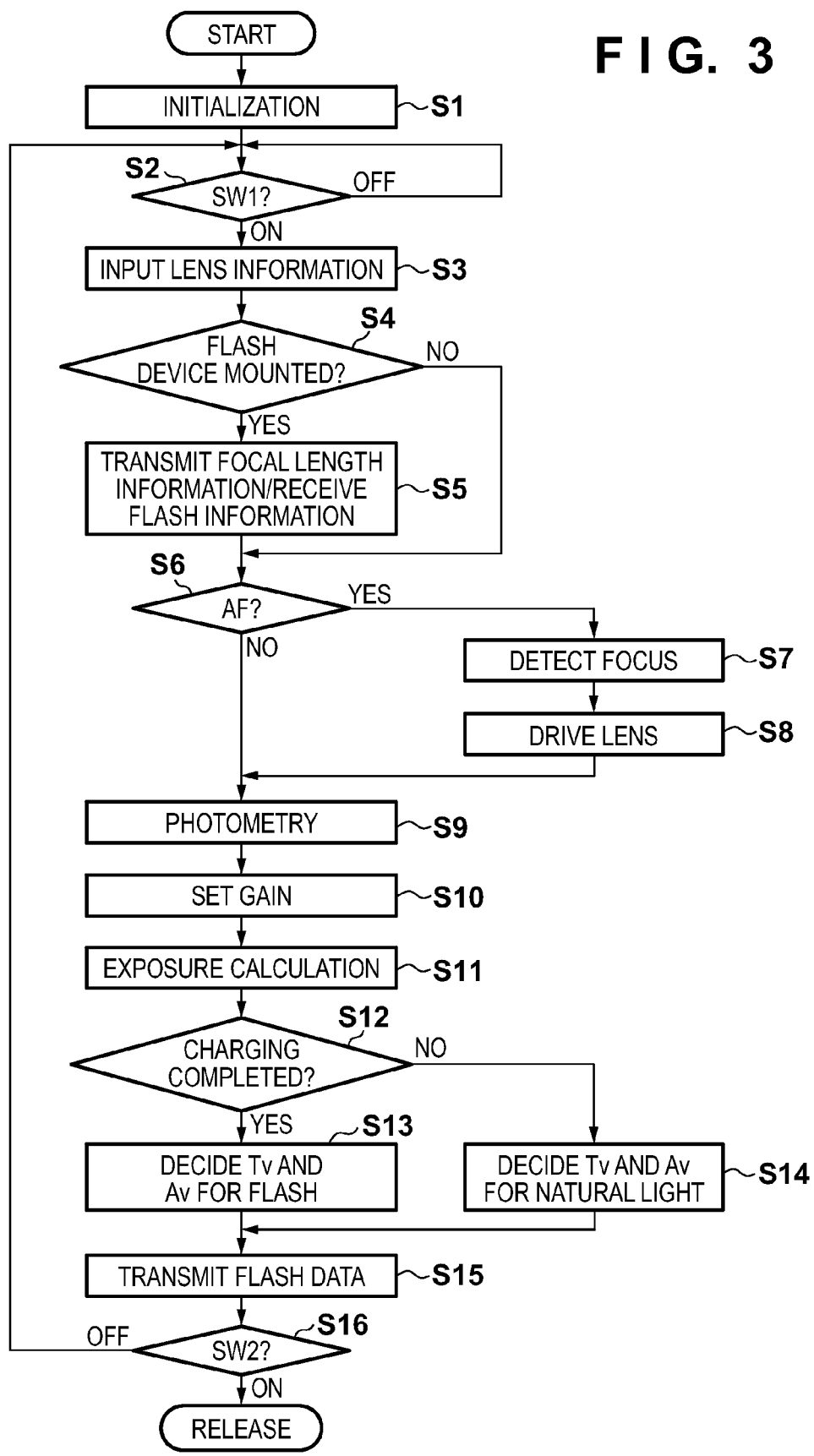
FIG. 3 is a flowchart for explaining the operation of a camera according to the embodiment.
Figure 4:
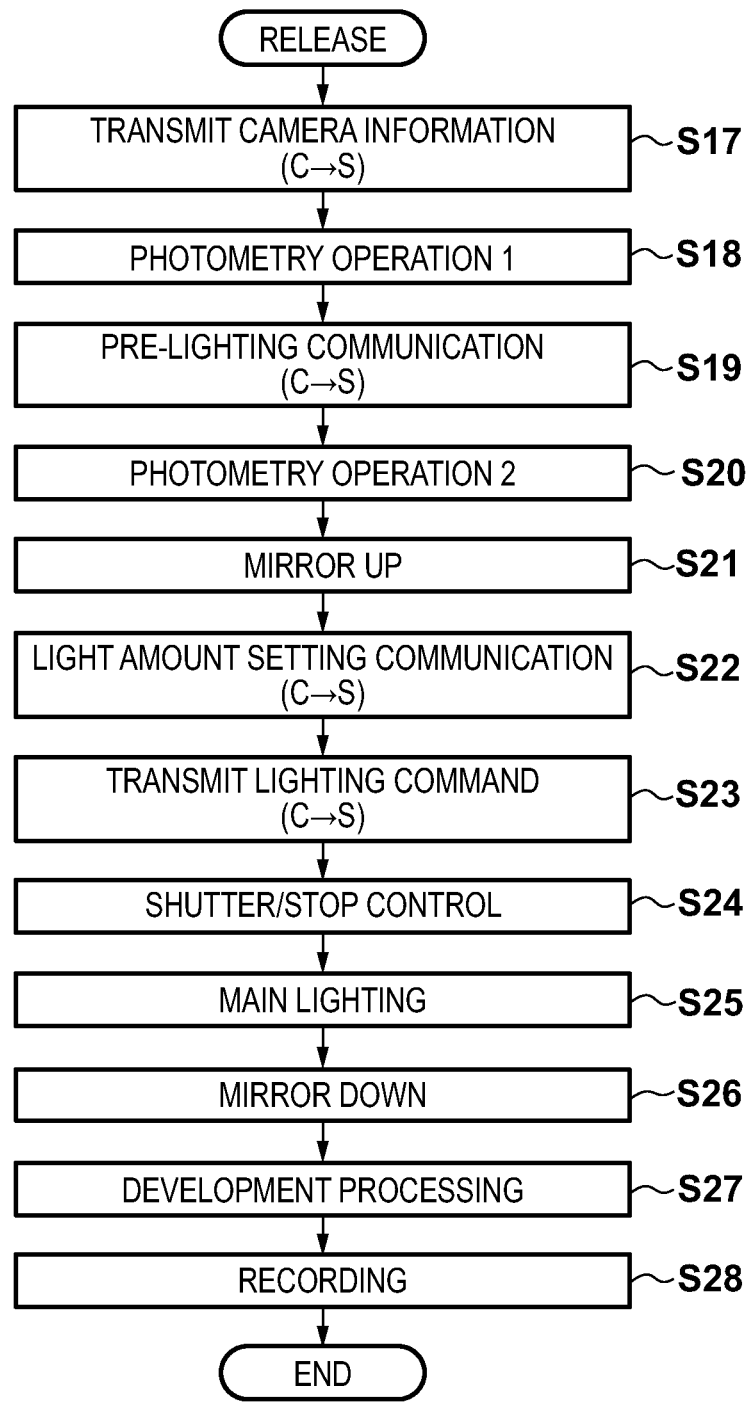
FIG. 4 is a flowchart for explaining the operation of the camera according to the embodiment.
Figure 5:
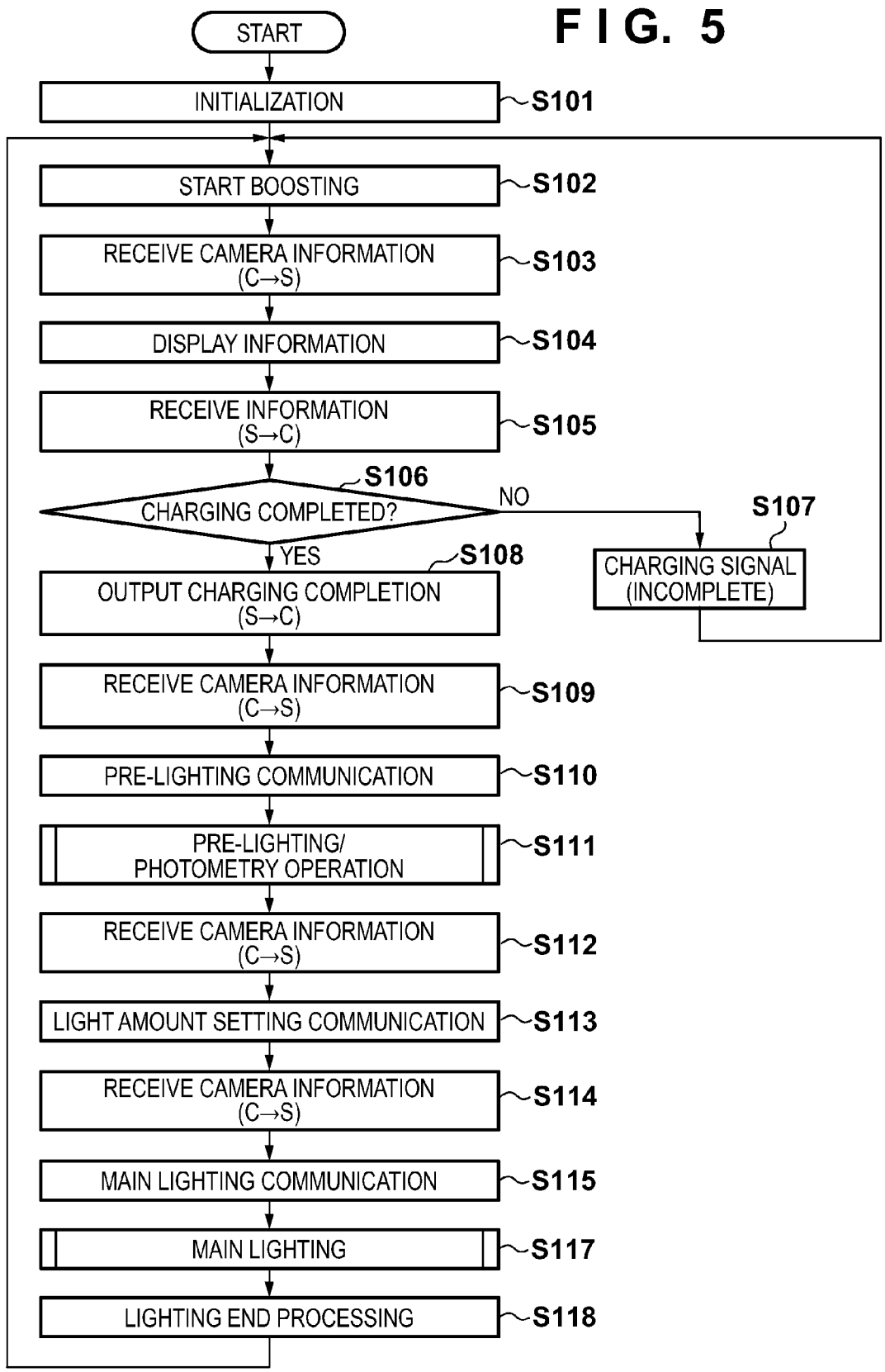
FIG. 5 is a flowchart for explaining the operation of a flash device according to the embodiment.
Figure 6:
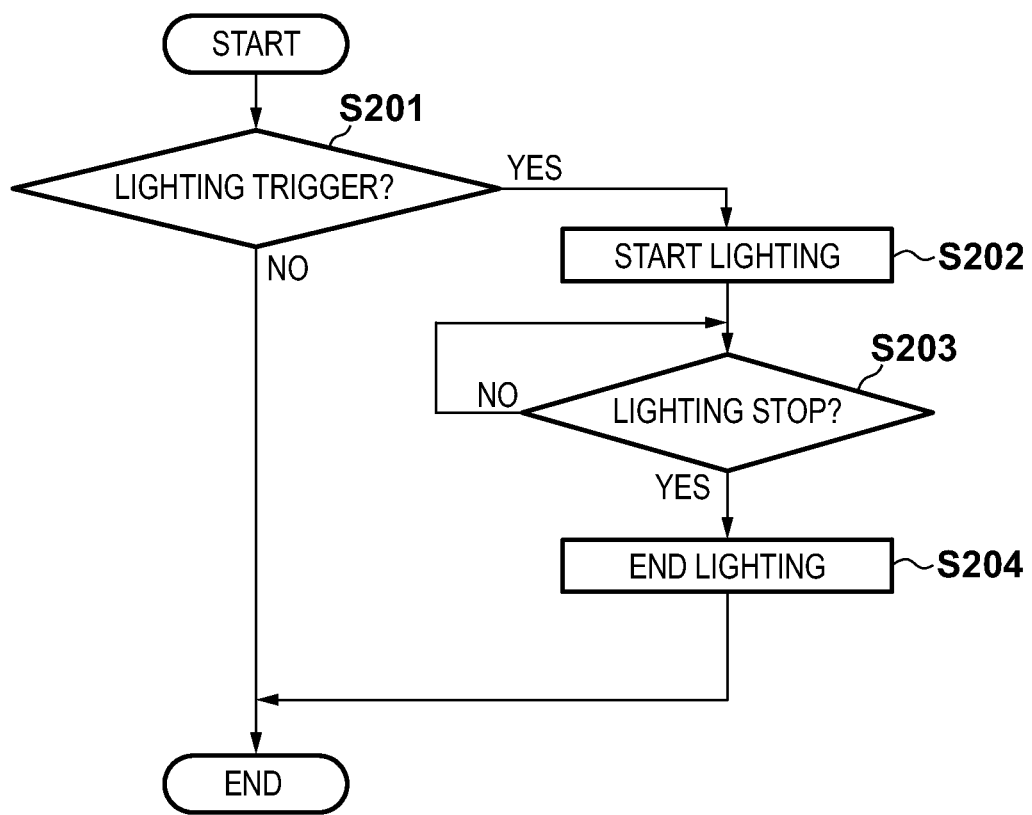
FIG. 6 is a flowchart for explaining the operation of the flash device according to the embodiment.
Figure 8:
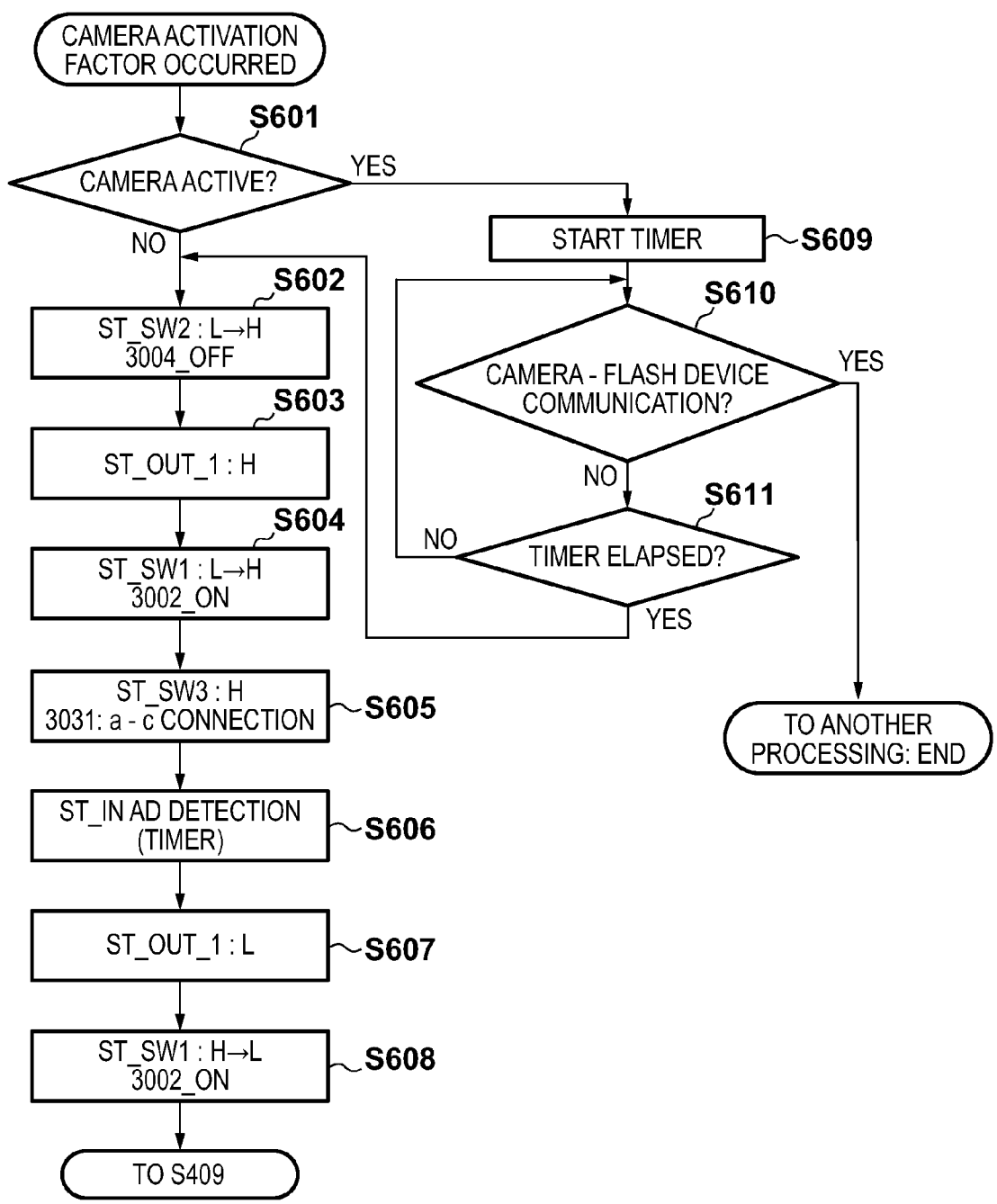
FIG. 8 is a flowchart for explaining activation processing of the camera from an idle state.
Figure 9:
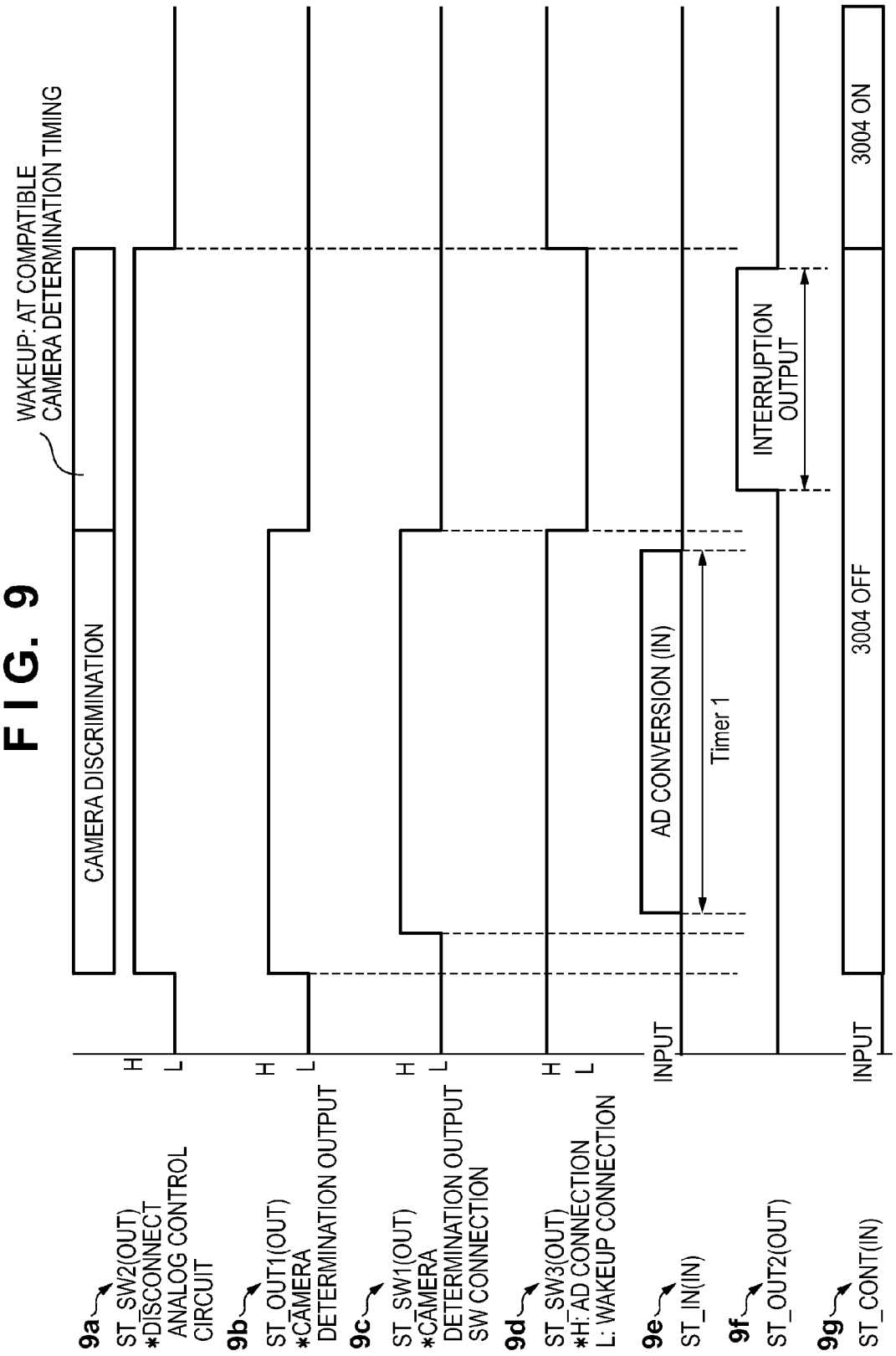
FIG. 9 is a timing chart for explaining the operation of the flash device according to the embodiment.

The operations of the camera 100 and flash device 300 according to this embodiment will be described below with reference to the flowcharts shown in FIGS. 3 to 9. FIGS. 3 and 4 are flowcharts showing the operation of the camera 100. FIGS. 5 and 6 are flowcharts showing the operation of the flash device 300. FIGS. 7A, 7B and 8 are flowcharts showing the operation from transition of the camera 100 to the idle state until activation by the flash device 300. Furthermore, FIG. 9 is a timing chart of respective signals to be output from the flash microcomputer 310 when the camera 100 in the idle state is activated from the flash device 300.

The practical operation of the camera microcomputer 101 will be described below with reference to the flowcharts shown in FIGS. 3 and 4. Note that this flowchart is a sequence under the assumption that both the camera microcomputer 101 and flash microcomputer 310 are in the active state. A sequence in the idle state will be described later with reference to FIGS. 8 and 9.

When the user turns on a power switch (not shown) to enable the camera microcomputer 101 of the camera 100, the camera microcomputer 101 starts a predetermined operation from step S1 in FIG. 3. In step S1, the camera microcomputer 101 initializes its own memories and ports. The camera microcomputer 101 loads switch states input using the input unit 112 and pre-set input information, and sets various imaging modes such as a method of deciding a shutter speed and that of deciding an aperture value. After the flash device 300 is activated, the camera 100 is set in a state in which the control waits for a release operation by the user (that is, the control waits for an SW1 ON operation).

The camera microcomputer 101 discriminates in step S2 whether or not a switch SW1 as a halfway pressing state of a shutter button (not shown) is ON. If SW1=OFF, the camera microcomputer 101 repeats this step; if SW1=ON, the process advances to step S3. In step S3, the camera microcomputer 101 communicates with the lens microcomputer 201 in the lens 200 via the communication line SC. Then, the camera microcomputer 101 obtains focal length information of the lens 200 (to be referred to as lens focal length information hereinafter) and optical information required for distance measurement and photometry. The camera microcomputer 101 checks in step S4 whether or not the flash device 300 is mounted on the camera 100. If the flash device 300 is mounted on the camera 100, the process advances to step S5; otherwise, the process jumps to step S6.

In step S5, the camera microcomputer 101 communicates with the flash device 300 via the camera IF circuit 1001 using the peripheral communication function, and outputs the lens focal length information obtained in step S3 to the flash microcomputer 310. The camera IF circuit 1001 transmits a level-converted serial signal via the SCLK terminal 402, MOSI terminal 403, and MISO terminal 404, and communicates with the flash microcomputer 310 via the serial communication IF circuit 3010. In this manner, the camera microcomputer 101 communicates with the flash microcomputer 310 via the communication line SC. Then, the flash microcomputer 310 controls an illumination angle of the flash device by driving the motor driving circuit 313 based on the received focal length information.

In step S5, the camera microcomputer 101 further communicates with the flash microcomputer 310, and issues an instruction to output flash information stored in a memory of the flash microcomputer 310 itself. In response to this instruction, the flash microcomputer 310 outputs the flash information to the camera microcomputer 101. This flash information includes current lighting mode information, main capacitor charging information, AF auxiliary light output information, and the like.

The camera microcomputer 101 discriminates in step S6 whether the imaging modes set in step S1 include a mode which requires an automatic focus detection operation (AF mode) or a mode which does not require that operation (MF mode). If the AF mode is discriminated, the process advances to step S7; if the MF mode is discriminated, the process immediately advances to step S9.

In step S7, the camera microcomputer 101 drives the focus detection circuit 107 to execute a focus detection operation based on a known phase difference detection method. Note that to which of a plurality of distance measurement points a focus is to be adjusted (distance measurement points) is decided according to points set from the input unit 112 or the imaging mode of the camera or is decided by a known automatic selection algorithm including a near point priority mode as a basic concept. In step S8, the camera microcomputer 101 stores the distance measurement points decided in step S7 in a RAM (not shown), and calculates a driving amount of the lens based on information of the focus detection circuit 107. The camera microcomputer 101 communicates with the lens microcomputer 201 in the lens 200 via the communication line SC, and notifies the lens microcomputer 201 of the driving amount as the calculation result. The lens microcomputer 201 controls the lens driving unit 203 based on the notified driving amount to drive the lens group 202 to an in-focus position.

In step S9, the camera microcomputer 101 obtains an object luminance value using the photometry circuit 106. Assume that in this example, the object luminance value is obtained by dividing a frame into 12 areas. In step S10, the camera microcomputer 101 sets a gain setting input from the input unit 112 in the gain switching circuit 108. The gain setting is, for example, an ISO speed setting. Furthermore, in step S10, the camera microcomputer 101 communicates with the flash microcomputer 310 via the communication line SC, and outputs the obtained gain setting information to the flash microcomputer 310. In step S11, the camera microcomputer 101 decides an exposure value (EVs) by a known algorithm from object luminance values EVb of the plurality of areas obtained in step S9.

The camera microcomputer 101 checks in step S12 whether or not the flash microcomputer 310 outputs a charging completion signal. If the flash microcomputer 310 outputs a charging completion signal, the process advances to step S13; otherwise, the process advances to step S14. Note that the camera microcomputer 101 stores the determination result (step S12) as to whether or not the flash microcomputer 310 outputs a charging completion signal, so as to use that result in the subsequent steps. In step S13, the camera microcomputer 101 decides a shutter speed (Tv) and aperture value (Av) suited to perform a flash imaging operation based on the photometry output (object luminance value) obtained in step S9. In step S14, the camera microcomputer 101 decides a shutter speed (Tv) and aperture value (Av) suited to perform a natural light imaging operation based on the photometry output (object luminance value) obtained in step S9. After the process in step S13 or S14 is executed, the process advances to step S15.

In step S15, the camera microcomputer 101 communicates with the flash microcomputer 310 via the communication line SC, and transmits other kinds of flash-related information to the flash microcomputer 310. Subsequently, the camera microcomputer 101 discriminates in step S16 whether or not a switch SW2 (not shown) as an imaging start switch is ON. If SW2=OFF, the camera microcomputer 101 repeats the operations from step S1 to step S16; if SW2=ON, the process advances to a series of release operations after step S17 shown in FIG. 4.

The operations after the release operation will be described below with reference to the flowchart shown in FIG. 4. In step S17, the camera microcomputer 101 communicates with the flash microcomputer 310 via the communication line SC, and outputs camera information to the flash microcomputer 310 as in step S5 above. In step S18, the camera microcomputer 101 executes a photometry operation of ambient light.

In step S19, the camera microcomputer 101 makes a pre-lighting communication required to control the flash device 300 to execute a pre-lighting operation with the flash microcomputer 310 via the communication line SC, and outputs the camera information to the flash microcomputer 310. The pre-lighting operation of the flash device 300 will be described later with reference to the flowchart of FIG. 5 which shows a flash operation. In step S20, the camera microcomputer 101 executes a photometry operation in a flash pre-lighting state of the flash device 300. The camera microcomputer 101 calculates a shutter speed, aperture value, and lighting amount of the flash device 300 based on the photometry information obtained in this way.

In step S21, the camera microcomputer 101 moves the main mirror 104 upward to retract it from an imaging optical path. In step S22, the camera microcomputer 101 makes a light amount setting communication with the flash microcomputer 310. The camera microcomputer 101 transmits the photometry information obtained in step S20 to the flash microcomputer 310 via the communication line SC, and outputs the camera information to the flash microcomputer 310. In step S23, the camera microcomputer 101 transmits a lighting command to the flash microcomputer 310. As in step S5, the camera microcomputer 101 communicates with the flash microcomputer 310 via the communication line SC to output the camera information to the flash microcomputer 310.

In step S24, the camera microcomputer 101 executes known shutter and stop operations. In step S25, when the shutter 103 reaches a nearly full open state, the camera microcomputer 101 makes a lighting trigger communication as a main lighting instruction, thus controlling the flash device 300 to execute a main lighting operation. Note that in the camera 100, the imaging device 102 is controlled in an accumulation state in synchronism with the beginning of front curtain traveling of the shutter 103. In response to completion of rear curtain traveling of the shutter 103, the imaging device 102 is controlled to be switched from the accumulation state to a read-out state, thus beginning to read out image data. After completion of a series of exposure operations in this way, the camera microcomputer 101 moves the main mirror 104, which is retracted from the imaging optical path, downward so as to obliquely set that mirror in the imaging optical path again in step S26. In step S27, the gain switching circuit 108 amplifies pixel data of the imaging device 102 by the gain set in step S10, and the A/D converter 109 converts the obtained signal into a digital signal. The digital signal processing circuit 111 applies predetermined signal processing such as white balance processing to the pixel data converted in this way so as to develop that data. In step S28, the camera microcomputer 101 stores developed image data in the memory (not shown). In this manner, an imaging routine of one frame ends.

A practical operation (flash control operation) in the flash microcomputer 310 in the flash device 300 will be described below with reference to the flowcharts shown in FIGS. 5 and 6.

When the user turns on a power switch (not shown) to enable the flash microcomputer 310, the flash microcomputer 310 starts a predetermined operation from step S101. In step S101, the flash microcomputer 310 initializes its own memories and ports. The flash microcomputer 310 loads switch states input by the input unit 320 and pre-set input information, and sets a flash imaging mode, lighting amount, and the like.

In step S102, the flash microcomputer 310 controls the booster circuit 302 to start its operation, thus making a lighting preparation. In step S103, the flash microcomputer 310 checks camera information (lens focal length information, lighting mode information, etc.) received from the camera microcomputer 101 via the communication line SC. In Step S104, the flash microcomputer 310 displays flash information stored in its own memory on the display unit 321. In step S105, the flash microcomputer 310 communicates with the camera microcomputer 101 via the communication line SC to output the flash information to the camera microcomputer 101.

The flash microcomputer 310 determines in step S106 whether or not a voltage boosted by the booster circuit 302 has reached a voltage level required for lighting of the discharge tube 307 (whether or not charging is complete). If it is determined that the voltage has reached the voltage level required for lighting of the discharge tube 307, the process advances to step S108. On the other hand, if it is determined in step S106 that the voltage boosted by the booster circuit 302 has not reached the voltage level required for lighting of the discharge tube 307 yet, the process advances to step S107. In step S107, the flash microcomputer 310 continues boosting by transmitting a charging signal to the booster circuit 302. At this time, the flash microcomputer 310 may transmit a charging incompletion signal to the camera microcomputer 101 via the communication line SC to notify the camera microcomputer 101 that flash lighting preparation is underway. After that, the process returns to step S102 to repeat the aforementioned steps.

In step S108, the flash microcomputer 310 transmits a charging completion signal via the communication line SC, thus notifying the camera microcomputer 101 that the flash device is ready to perform a lighting operation. Next, the flash microcomputer 310 receives camera information in step S109. At this time, the flash microcomputer 310 checks whether or not the camera microcomputer 101 outputs a pre-lighting start signal. If the pre-lighting start signal is output, the flash microcomputer 310 makes a pre-lighting communication in step S110 (corresponding to step S19 in FIG. 4 of the operation flowchart of the camera 100). Note that at this time, the flash microcomputer 310 controls the wireless communication circuit 324 to transmit a pre-lighting start signal to the slave flash device 300-2 via the wireless antenna 325.

In step S111, the flash microcomputer 310 performs a photometry operation simultaneously with a pre-lighting operation (corresponding to step S19 in FIG. 4 of the operation flowchart of the camera 100). FIG. 6 is a flowchart showing the pre-lighting/main lighting (step S117 to be described later) operation of the flash device 300.

The flash microcomputer 310 checks in step S201 whether or not a lighting start signal is output from the camera microcomputer 101. If no lighting start signal is output, this routine ends. On the other hand, if a lighting start signal is output, the process advances to step S202. In step S202, the flash microcomputer 310 supplies a trigger signal from the lighting control terminal to the lighting control circuit 308 via the AND gate 311, thus starting a flash lighting operation.

The flash microcomputer 310 determines in step S203 whether or not a lighting amount corresponding to the light amount decided by the lighting amount calculation value notified from the camera microcomputer 101 via the communication line SC has been reached. The output from the integration circuit 309, which integrates a received photo-current of the photodiode 323, is input to the inverting input terminal of the comparator 312 and the A/D converter terminal of the flash microcomputer 310. The non-inverting input terminal of the comparator 312 is connected to the output terminal of the internal D/A converter of the flash microcomputer 310, and a value corresponding to the lighting amount which corresponds to the light amount decided based on the lighting amount calculation value is set in that D/A converter. The pre-lighting amount is set to be a small light amount (for example, 1/32 of a full lighting amount). Note that the main lighting amount may be set as a relative value of the pre-lighting amount.

When the integrated value, which is output from the integration circuit 309 and is input to the inverting input terminal of the comparator 312, is equal to or larger than the lighting amount set at the non-inverting input terminal, the comparator 312 is enabled. As a result, before the lighting amount reaches a set value, lighting is continued (S203); if the lighting amount has reached the set value, the AND gate 311 outputs a lighting stop signal, and the lighting control circuit 308 stops lighting (S204).

Referring back to FIG. 5, in step S112, the flash microcomputer 310 receives camera information to check whether or not a light amount setting signal is output from the camera microcomputer 101. If the light amount is set based on the photometry calculation result of the pre-lighting operation, the flash microcomputer 310 makes a light amount setting in step S113 (corresponding to step S22 in FIG. 4 of the operation flowchart of the camera 100). In step S114, the flash microcomputer 310 receives camera information to check whether or not a flash lighting start signal is output from the camera microcomputer 101. The flash lighting start signal in this case is a synchro signal input from the X terminal 405 to the flash device 300, and indicates a synchro timing (corresponding to step S25 (main lighting instruction) in FIG. 4 of the operation flowchart of the camera 100). If the main lighting instruction is output, the flash microcomputer 310 makes a main lighting communication in step S115. In step S117, the flash microcomputer 310 executes a main lighting operation using the discharge tube 307. The main lighting operation is the same as that described in the flowchart of FIG. 6 above (however, a lighting amount setting in the D/A converter in the flash microcomputer 310 is different).

In step S118, the flash microcomputer 310 executes lighting end processing. In the lighting end processing, the flash microcomputer 310 wirelessly transmits a sequence end signal to the flash device 300-2. When the camera 100 judges that a currently captured image is a captured image obtained at a normal flash lighting timing, it appends and saves that information to a file as imaging condition information when an image is to be recorded. Note that when the flash imaging operation was not normally executed, the camera 100 records an image file appended with information that advises accordingly.

(Flowchart of Idle State)

The operations of the camera 100 and flash device 300 when the camera 100 transits to the idle state, and when it transits from the idle state to the active state will be described below with reference to the flowcharts shown in FIGS. 7A, 7B and 8 and the timing chart shown in FIG. 9. Note that a camera idle factor required for the camera to transit to the idle state includes a case in which no operation input is generated over a predetermined time period in the camera 100 which operates in, for example, a power saving mode. The camera 100 of this embodiment transits to the idle state after an elapse of a predetermined time period since occurrence of a camera idle factor.

The camera microcomputer 101 communicates with the flash microcomputer 310 via the camera IF circuit 1001 and serial communication IF circuit 3010. When such normal communication is made between the camera 100 and flash device 300, the flash device 300 is inhibited from outputting a camera activation signal (S400, S401). At this time, in the camera 100, the camera microcomputer 101 outputs H level to the C_SW terminal to control the analog switch 1002 to connect between b-c. Then, the connection between the interruption generating circuit 1003 and analog signal terminal 401 is disconnected, and the analog signal terminal 401 is connected to the ANALOG terminal of the camera IF circuit 1001.

On the flash device 300 side, when the flash microcomputer 310 sets the ST_SW2 terminal at L level, the inverter circuit 3006 outputs H level to set the analog switch 3004 in the connected state. Then, the analog control circuit 3005 is connected to the ANALOG terminal of the camera IF circuit 1001 via the analog signal terminal 401 and analog switch 3004. Also, when the flash microcomputer 310 sets the ST_SW1 terminal at L level, the analog switch 3002 is set in an open state to disconnect the connection between the camera determination output circuit 3001 and analog signal terminal 401. The ST_SW3 terminal of the flash microcomputer 310 is set at H level to control the analog switch 3031 to connect between a-c. For this reason, the camera determination input circuit 3032 is connected to the analog signal terminal 401, and the connection between the wakeup output circuit 3033 and analog signal terminal 401 is disconnected. Also, the ST_OUT2 terminal of the flash microcomputer 310 is set at L level.

Figure 12:
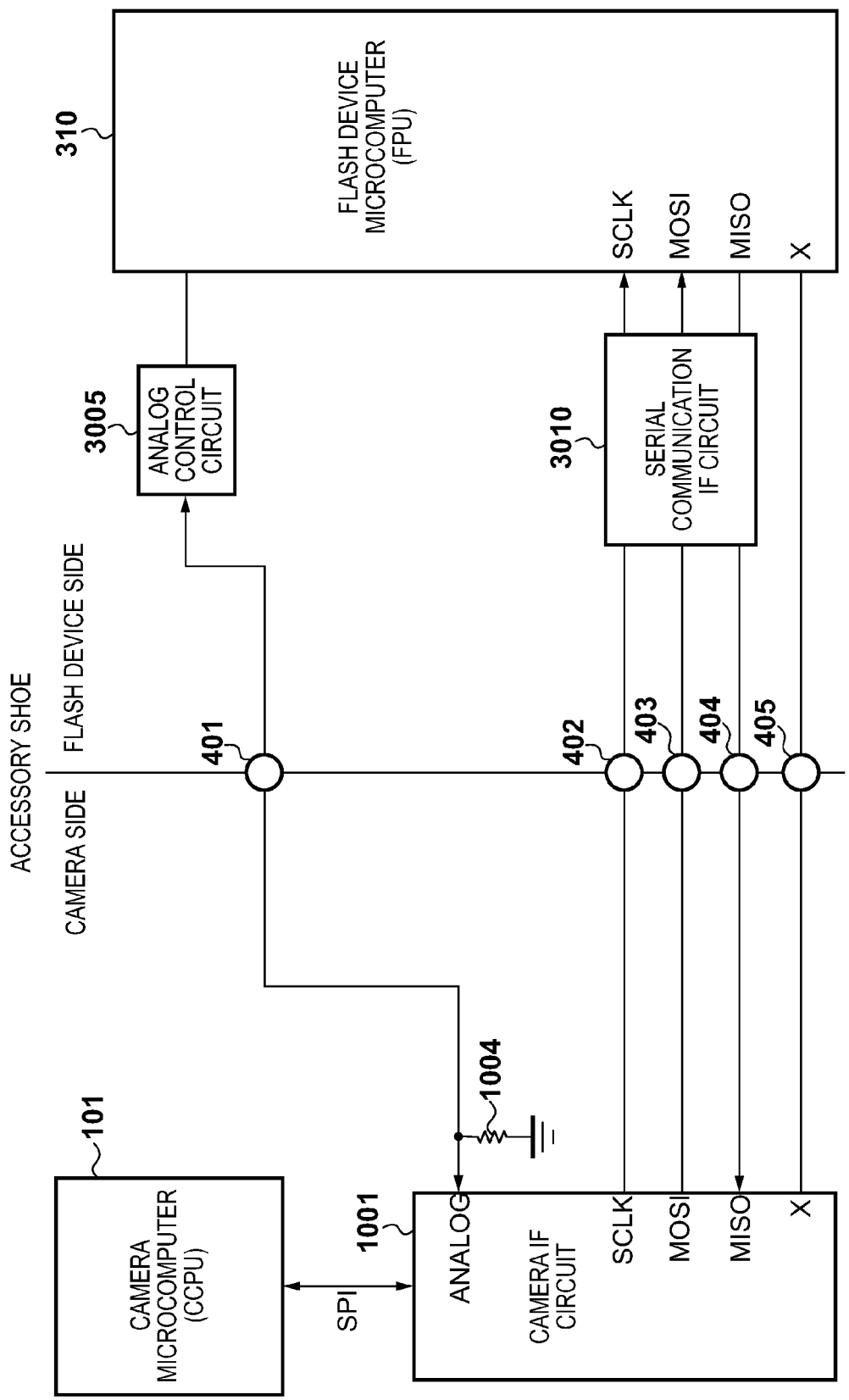
FIG. 12 is a block diagram showing the circuit arrangement in a general accessory shoe.

With the above settings, as the connection destination of the analog signal terminal 401, the same state as that of the conventional circuit shown in FIG. 12 is selected. FIG. 12 is a block diagram showing the arrangement associated with the conventional interface between the camera and flash device. In FIG. 12, the ANALOG terminal of the camera IF circuit 1001 is directly connected to the analog control circuit 3005 of the flash device 300 via the analog signal terminal 401.

When a camera idle factor occurs, the process advances from step S402 to step S403. In step S403, the camera microcomputer 101 switches the connection of the analog switch 1002 to connect the interruption generating circuit 1003 and C_IRQ terminal. More specifically, the camera microcomputer 101 outputs an L-level signal from the C_SW terminal to control the analog switch 1002 to connect between a-c, thereby connecting the interruption generating circuit 1003 and C_IRQ terminal. With this switching, the connection between the analog signal terminal 401 and the ANALOG terminal of the camera IF circuit 1001 is disconnected.

Note that when the interruption generating circuit 1003 is connected to the C_IRQ terminal of the camera microcomputer 101, an interruption input by the C_IRQ terminal is valid. Note that an interruption input from the C_IRQ terminal of the camera microcomputer 101 may always be valid. The C_IRQ terminal is pulled up to a camera microcomputer power supply inside or outside of the camera microcomputer 101, and generates an interruption upon detection of an L-level input.

After that, the camera microcomputer 101 notifies the flash microcomputer 310 of the flash device 300 of transition to the idle state in step S404, and transits to the idle state in step S405. After the aforementioned processes, the camera microcomputer 101 transits to the idle state, and waits for an interruption input. Whether or not an interruption factor is generated is determined based on an interruption state of the C_IRQ terminal of the camera microcomputer 101. When the flash device 300 generates an interruption factor required to activate the camera, the idle state is canceled.

When the flash device 300 outputs a camera activation signal (S412), the interruption generating circuit 1003 supplies a signal to the C_IRQ terminal of the camera microcomputer 101 to activate the camera microcomputer 101 (S413). The camera activation signal is an H-level signal output from the wakeup output circuit 3033 of the flash device 300. More specifically, when the wakeup output circuit 3033 inputs the camera activation signal (H-level signal) to the analog signal terminal 401, the H-level signal is applied to the base of the NPN transistor 1033 of the interruption generating circuit 1003. Then, the NPN transistor 1033 is enabled to apply an L-level signal to the C_IRQ terminal of the camera microcomputer 101, thus generating an interruption to the camera microcomputer 101 (S412).

In step S413, the camera microcomputer 101 processes the interruption, and transits to the active state. In step S414, the camera microcomputer 101 switches the connected state of the analog switch 1002 to a connection between b-c, thus disconnecting the connection between the interruption generating circuit 1003 and analog signal terminal 401. With this switching, the analog signal terminal 401 and the ANALOG terminal of the camera IF circuit 1001 are connected via the analog switch 1002.

In step S415, the camera microcomputer 101 notifies the flash device 300 using a communication interruption signal that the camera 100 is in the active state. Note that as the notification method, a method of, for example, changing a given potential of the serial communication terminals (for example, a method of changing the SCLK terminal from L level to H level) may be used. Also, as the notification method, a voltage variation of the analog signal terminal 401 may be used. After that, in step S416, the camera microcomputer 101 inhibits the flash device 300 from outputting a camera activation signal (as in step S400). Subsequently, the camera microcomputer 101 communicates with the flash microcomputer 310 in a conventional manner.

On the other hand, on the flash device 300 side, upon reception of the notification indicating transition to the idle state in step S406, the flash microcomputer 310 is ready to output a camera activation signal. In step S407, the flash microcomputer 310 waits for occurrence of a predetermined factor (activation factor) for the camera 100. When the user performs, for example, a specific button operation on the input unit 320, the flash microcomputer 310 determines that the activation factor of the camera 100 has occurred.

As an example of occurrence of the activation factor, when a transmission signal of a master flash device is received by a slave flash device in an environment like a wireless camera system having the flash device 300, it can be judged that the camera activation factor has occurred. For example, a wireless system shown in FIG. 11 includes the camera 100, a slave camera 100-2, the flash device 300, and the slave flash device 300-2. As described above, the flash device 300 is connected to the camera 100 via the accessory shoe. The camera 100 and flash device 300 respectively serve as a master camera and master flash device. The flash device 300 exchanges data using radio waves with camera accessories such as an external flash device and remote controller via the wireless communication circuit 324 and wireless antenna 325. Upon reception of data, a radio wave signal received by the wireless antenna 325 is converted into a reception signal by the wireless communication circuit 324, and is interpreted by the flash microcomputer 310. Upon transmission of data, a transmission signal instructed by the flash microcomputer 310 is converted into a radio wave signal by the wireless communication circuit 324, and the converted signal is output from the wireless antenna 325.

Figure 11:
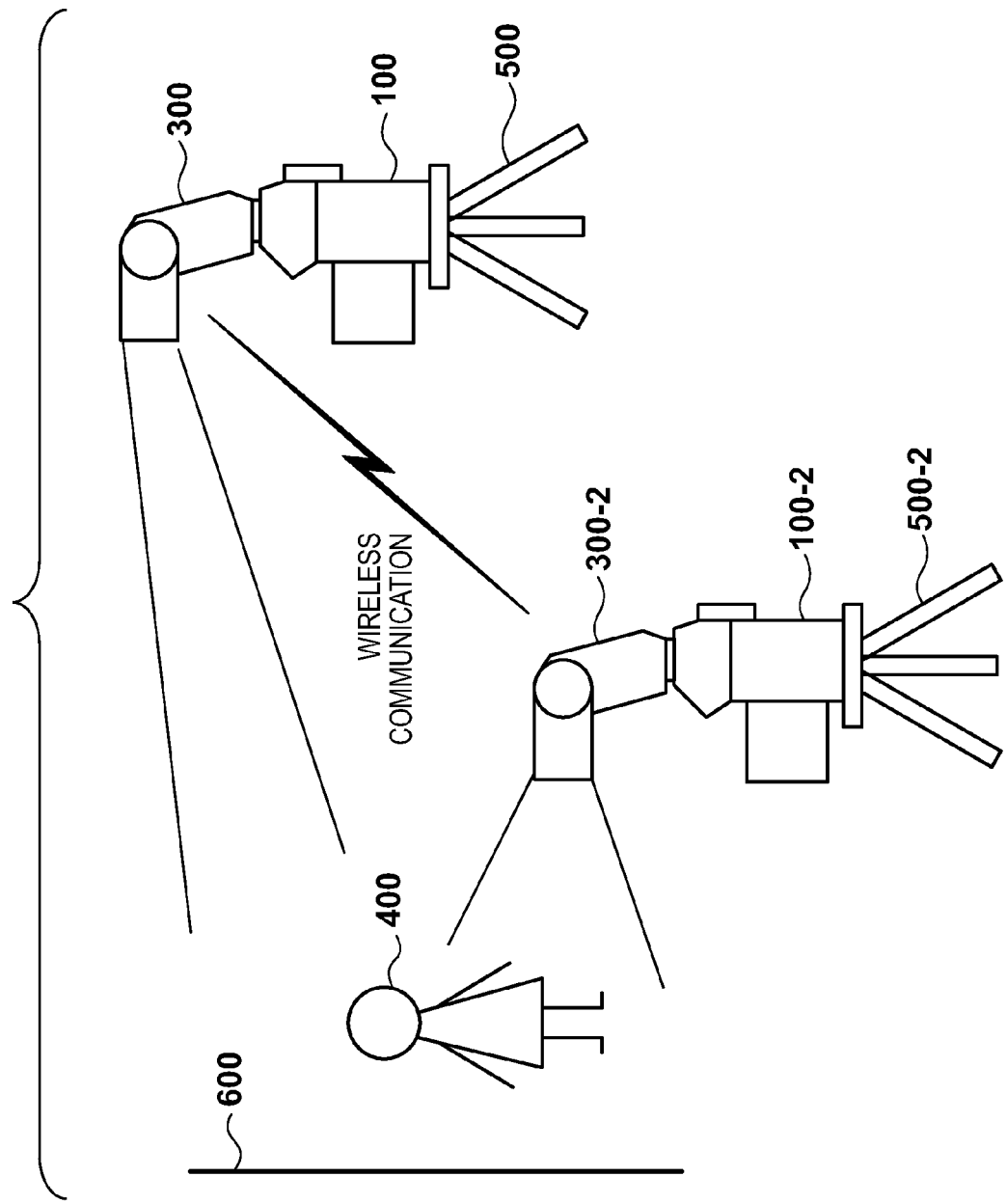
FIG. 11 is a view showing the camera system according to the embodiment.

The slave camera 100-2 and slave flash device 300-2 operate based on communications instructed by the flash device 300. The flash device 300 and slave flash device 300-2 make wireless communications based on a method such as IEEE802.15.4 as given wireless communication standards. Reference numeral 400 denotes an object; 600, a screen; 500, a tripod used to fix the camera 100; and 500-2, a tripod used to fix the camera 100-2. The system shown in FIG. 11 is configured under the assumption of a flash imaging operation in a photo studio. For example, a camera activation factor occurs when the slave flash device 300-2 receives a reception signal. After that, the slave camera 100-2 is activated via the slave flash device 300-2, thus executing a cooperative imaging operation by the cameras 100 and 100-2. That is, when the slave flash device 300-2 receives an imaging instruction signal to the camera 100-2 from the camera 100 as an external device, if the slave camera 100-2 is in the idle state, the slave flash device 300-2 outputs a camera activation signal to the slave camera 100-2, thus activating the slave camera 100-2.

An example of occurrence of an activation factor unlike in the case of reception of the imaging instruction signal includes a case in which a modeling lighting instruction is received. For example, in the wireless system shown in FIG. 11, when the user operates the flash device 300 to issue a modeling lighting instruction while the camera 100 as the master camera is in the idle state, the camera 100 has to be activated to decide modeling lighting amounts of the respective flash devices. For this purpose, the flash device 300 outputs a camera activation signal to activate the camera 100, thus executing modeling lighting operations.

Referring back to the flowchart shown in FIG. 7A, the flash microcomputer 310 executes camera type discrimination processing in step S408. As the type discrimination processing in this step, whether or not the connected camera is compatible with the system of this embodiment is discriminated. The reason why such type discrimination is executed is to protect a camera incompatible with this system from electrical damages. The incompatible camera may have a circuit arrangement in which a conventional interface circuit is connected to the analog signal terminal 401, and an activation signal output from the flash device 300 cannot be received. For example, this case corresponds to a combination of the camera with the conventional circuit arrangement shown in FIG. 12 and the flash device with the circuit arrangement shown in FIG. 1. In this way, since the internal circuit of the camera may be electrically damaged, the camera type discrimination processing is executed to avoid such damages.

The camera type discrimination operation by the flash device 300 will be described below with reference to the flowchart shown in FIG. 8. In order to attain the camera type discrimination processing, for example, the connection to the analog signal terminal 401 is switched. The flash microcomputer 310 discriminates in step S601 whether or not the camera 100 is active. For example, in this discrimination processing, whether or not the camera 100 is reactivated until step S408 later although an idle state signal of the camera 100 is input in step S406 is discriminated. If the camera 100 is inactive, the process advances to step S602; if the camera 100 is reactivated, the process advances to step S609. In step S609, the flash microcomputer 310 starts a pre-set timer time. After that, the flash microcomputer 310 determines in step S610 whether or not a camera-flash device communication is made. If no communication is made, the flash microcomputer 310 determines in step S611 whether or not the timer time started in step S609 has elapsed. If the timer time has not elapsed yet, the process returns to step S610; otherwise, the process advances to step S602. On the other hand, if it is determined in step S610 that the camera-flash device communication is made, the flash microcomputer 310 inhibits the flash device 300 from outputting a camera activation signal, and the process advances to another processing.

In step S602, the flash microcomputer 310 switches the ST_SW2 terminal from L level to H level (9a of FIG. 9). When the ST_SW2 terminal is at H level, since the output of the inverter circuit 3006 is at L level, the analog switch 3004 is set in an open state, and the analog signal terminal 401 and analog control circuit 3005 are not connected (9g of FIG. 9). In step S603, the flash microcomputer 310 sets the ST_OUT1 terminal at H level (9b of FIG. 9). When the ST_OUT1 terminal of the flash microcomputer 310 is set at H level, the analog switch 3013 (FIG. 10) of the camera determination output circuit 3001 is set in a connected state, and the camera determination output circuit 3001 outputs a determination signal used to discriminate whether or not the connected camera is a compatible camera.

In step S604, the flash microcomputer 310 switches the ST_SW1 terminal from L level to H level (9c of FIG. 9). The analog switch 3002 is set in a connected state since its control terminal is set at H level, thus connecting the analog signal terminal 401 and the camera determination output circuit 3001. In step S605, the flash microcomputer 310 sets the ST_SW3 terminal at H level (9d of FIG. 9). In this embodiment, as shown in FIG. 9, 9d, since the ST_SW3 terminal before the camera type discrimination processing is at H level, H level is maintained without switching the level of the ST_SW3 terminal in step S605. When the ST_SW3 terminal before the camera type discrimination processing is at L level, the ST_SW3 terminal is switched from L level to H level in step S605. Since the control terminal of the analog switch 3031 is set at H level, the analog switch 3031 connects between a-c, and the camera determination input circuit 3032 and analog signal terminal 401 are connected.

In the aforementioned state, in the flash device 300, the camera determination output circuit 3001 is connected to the analog signal terminal 401. In the camera 100, the analog signal terminal 401 is connected to the resistors 1031 and 1032 of the interruption generating circuit 1003 via the a-c connection of the analog switch 1002. As a result, the camera determination input circuit 3032 detects a voltage value according to a combined resistance value of the resistors 1031 and 1032. On the other hand, in case of a general camera, the analog signal terminal 401 is connected to the pull-down resistor 1004 of the ANALOG terminal of the camera IF circuit 1001 (FIG. 12). As a result, the camera determination input circuit 3032 detects a voltage value according to a resistance value of the pull-down resistor 1004.

Assume that the ground level of the camera 100 and that of the flash device 300 have the same potential. In this case, in order to discriminate the compatible camera from an incompatible camera, the combined resistance of the resistors 1031 and 1032 and the resistance value of the pull-down resistor 1004 are set to be different, and an input resistance value when viewed from the analog signal terminal 401 is changed. The output level of the camera determination output circuit 3001 changes based on this input resistance value. The flash microcomputer 310 executes the camera type discrimination processing based on a value obtained when the camera determination input circuit 3032 reads that level and A/D-converts the level. This discrimination method will be described below.

Assume that an output voltage when the camera determination output circuit 3001 is not connected is a voltage (for example, about 0.5 V) as a base-emitter voltage of the NPN transistor 1033, which does not enable the transistor, in the interruption generating circuit 1003. Let Ra be the combined resistance of the resistors 1031 and 1032 in the compatible camera, and Rn be the resistance value of the pull-down resistor 1004 (Ra<Rn).

Also, letting R1 be the resistance value of the resistor 3011 of the camera determination output circuit 3001 shown in FIG. 10, and R2 be the resistance value of the resistor 3012, and assuming that the resistances and contact resistances of the respective analog switches are 0Ω, output voltages of respective conditions are calculated as follows.

Letting
Vaout: a compatible camera detection voltage,
Vnout: an incompatible camera detection voltage,
Vout: a non-connected camera detection voltage, and
V1: a constant voltage output, $$Vaout=V1\times[(R2\times Ra)/(R2+Ra)]/\{R1+[(R2\times Ra)/(R2+Ra)]\}$$

$$Vnout=V1\times[(R2\times Rn)/(R2+Rn)]/\{R1+[(R2\times Rn)/(R2+Rn)]\}$$

$$Vout=V1\times[(R2)/(R1+R2)]$$

Also, since the outputs satisfy:

$$Vaout<Vnout<Vout(Ra<Rn)$$

for example, when a voltage is less than Vaout, it is determined that the connected camera 100 is a compatible camera.

Referring back to FIG. 8, in step S606, the flash microcomputer 310 receives the output of the camera determination input circuit 3032 via the ST_IN terminal, and executes A/D conversion for a predetermined period (9e of FIG. 9; Timer1). The flash microcomputer 310 stores the A/D conversion result. In step S607, the flash microcomputer 310 switches the ST_OUT1 terminal from H level to L level (9b of FIG. 9). When the ST_OUT1 terminal of the flash microcomputer 310 is set at L level, the analog switch 3013 (FIG. 10) is set in an open state, and the camera determination output circuit 3001 stops outputting a compatible camera discrimination signal. In step S608, the flash microcomputer 310 switches its ST_SW1 terminal from H level to L level (9c of FIG. 9). Since L level is applied to the control terminal of the analog switch 3002, the analog switch 3002 is set in an open state, and the connection between the analog signal terminal 401 and camera determination output circuit 3001 is disconnected.

Referring back to FIG. 7A, as a result of determination in step S408, if a compatible camera is determined, the process advances to step S410 (FIG. 7B); if an incompatible camera is determined, the process advances to step S420 (FIG. 7B). If a compatible camera is determined, the connection to the analog signal terminal 401 is switched in step S410 and subsequent steps, and a camera activation signal required to activate the camera 100 in the idle state to the active state is provided to the camera 100.

In step S410, the flash microcomputer 310 switches the ST_SW3 terminal from H level to L level (9d of FIG. 9). Since the control terminal of the analog switch 3031 is set at L level, the analog switch 3031 connects between b-c, and the wakeup output circuit 3033 and analog signal terminal 401 are connected. In step S411, the flash microcomputer 310 switches the ST_OUT2 terminal from L level to H level only for a time period set by the internal timer (9f of FIG. 9). Thus, the wakeup output circuit 3033 outputs an H-level signal (camera activation signal) only during an H-level period of the ST_OUT2 terminal. The H-level output of the wakeup output circuit 3033 is supplied to the interruption generating circuit 1003 of the camera 100 via the b-c connection of the analog switch 3031, the analog signal terminal 401, and the a-c connection of the analog switch 1002. The interruption generating circuit 1003 outputs an interruption signal to the C_IRQ terminal in response to the H-level signal from the wakeup output circuit 3033.

In order to discriminate whether or not to receive a notification indicating that the camera 100 is in the active state, the flash microcomputer 310 discriminates in step S421 whether or not a communication interruption signal is transmitted from the camera 100. If the communication interruption signal is received, the process advances to step S422; otherwise, the process advances to step S424. In step S424, the flash microcomputer 310 executes elapsed time discrimination processing using the timer to determine whether or not a predetermined timer time has elapsed. If the timer time has not elapsed yet, the process returns to step S421; otherwise, the process advances to normal communication processing in step S425. In step S422, since the notification indicating that the camera 100 is in the active state is received, the flash microcomputer 310 inhibits an output operation of a camera activation signal. Also, the flash microcomputer 310 inhibits a camera determination input operation. In step S423, the flash microcomputer 310 switches the ST_SW3 terminal from L level to H level (9d of FIG. 9). Then, since the control terminal of the analog switch 3031 is set at H level, the analog switch 3031 connects between a-c, and the camera determination input circuit 3032 and analog signal terminal 401 are connected. In this embodiment, the ST_SW3 terminal is switched from L level to H level in step S423. However, if the level of the ST_SW3 terminal is switched in step S605, as described above, the level of the ST_SW3 terminal need not be switched in step S423. Then, the process advances to step S420.

In step S420, the flash microcomputer 310 switches the ST_SW2 terminal from H level to L level (9a of FIG. 9). When the ST_SW2 terminal is at L level, since the output of the inverter circuit 3006 is set at H level, the analog switch 3004 is set in a connected state, and the analog signal terminal 401 and analog control circuit 3005 are connected (9g of FIG. 9). After that, in step S425, a normal communication between the camera 100 (S416) and flash device 300 is made. At this time, when the output operation of a camera activation signal is not inhibited, the output operation of the camera activation signal from the flash device 300 is inhibited. The camera microcomputer 101 communicates with the flash microcomputer 310 via the camera IF circuit 1001 and serial communication IF circuit 3010. Then, the control advances to the processing of the operation flowcharts shown in FIGS. 3 to 5.

As described above, according to this embodiment, since an activation signal which is output from a connected accessory and is used to activate a camera in an idle state is provided using an analog communication terminal, the communication performance of a serial communication is never adversely influenced. Whether or not a connected camera is a compatible camera is determined, and an activation signal is output only when the compatible camera is determined. Thus, damages on circuit elements of an incompatible camera can be reduced. Also, according to this embodiment, a system which allows a connected accessory to execute activation control of a camera while maintaining compatibility of a conventional external interface can be provided.

The preferred embodiment of the present invention has been described. However, the present invention is not limited to such specific embodiment, and various modifications and changes can be made within the scope of its gist.

For example, in the example of the embodiment, the present invention is applied to the flash device as the connected accessory. However, the present invention is not limited to this. For example, the present invention is applied to, as an accessory connectable to the accessory shoe like the flash device, a GPS unit, a communication device which does not include any lighting unit such as a flash device and is mainly used to communicate with an external device, and the like.

According to the present invention, a connected accessory can activate an image capture apparatus in an idle state without causing any communication quality drop between the image capture apparatus and connected accessory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-186361, filed Aug. 29, 2011, which is hereby incorporated by reference herein in its entirety.

What is claimed is:

1. An accessory connectable to an image capture apparatus, comprising:
   a first signal terminal which is electrically connected to a terminal provided to an accessory shoe of a connected image capture apparatus so as to communicate with the connected image capture apparatus, a signal level of a signal going through said first signal terminal corresponding to information to be communicated via said first signal terminal;
   a second signal terminal used to make a serial communication with the connected image capture apparatus, which is different from said first signal terminal;
   an activation signal generation unit configured to generate an activation signal required to change the connected image capture apparatus from a first state to a second state, wherein the first state is a state where the serial communication via the second signal terminal is not executable, and the second state is a state where the serial communication via the second signal terminal is executable;
   a control unit configured to control to output the activation signal to the connected image capture apparatus via said first signal terminal; and
   a determination unit configured to determine a type of the connected image capture apparatus by using said first signal terminal,
   wherein when said determination unit determines that the connected image capture apparatus is a specific image capture apparatus, said control unit controls to output the activation signal to the connected image capture apparatus via said first signal terminal.

2. The accessory according to claim 1, wherein a voltage value or a current value applied to said first signal terminal corresponds to the information to be communicated via said first signal terminal.

3. The accessory according to claim 1, further comprising:
a lighting unit; and
a lighting signal terminal used to accept a lighting instruction signal of said lighting unit from the connected image capture apparatus,
wherein said first signal terminal is different from said lighting signal terminal.

4. The accessory according to claim 3, wherein said accessory notifies, via said first signal terminal, the connected image capture apparatus that said lighting unit is ready to execute a lighting operation.

5. The accessory according to claim 4, wherein when the connected image capture apparatus is in the first state, said accessory does not notify, via said first signal terminal, the connected image capture apparatus that said lighting unit is ready to execute a lighting operation.

6. The accessory according to claim 1, wherein said accessory recognizes, via said first signal terminal, that the connected image capture apparatus is in an imaging preparation completion state.

7. The accessory according to claim 1, wherein when said determination unit determines that the connected image capture apparatus is an image capture apparatus which is set in the second state in response to the activation signal, said control unit controls to output the activation signal to the connected image capture apparatus via said first signal terminal.

8. The accessory according to claim 1, wherein said determination unit determines the type of the image capture apparatus via said first signal terminal when the connected image capture apparatus is in the first state.

9. The accessory according to claim 1, further comprising:
a determination signal generation unit configured to generate a determination signal required to determine the type of the connected image capture apparatus,
wherein said control unit controls to output the determination signal to the connected image capture apparatus via said first signal terminal when the connected image capture apparatus is in the first state.

10. The accessory according to claim 9, wherein when said control unit controls to output the determination signal to the connected image capture apparatus via said first signal terminal, said control unit controls to connect said determination unit to said first signal terminal.

11. The accessory according to claim 1, further comprising:
a reception unit configured to receive information from an external device,
wherein when said reception unit receives the information from the external device, said control unit controls to output the activation signal to the connected image capture apparatus via said first signal terminal.

12. The accessory according to claim 11, wherein said reception unit receives an imaging instruction signal to the connected image capture apparatus from the external device, and
when said reception unit receives the imaging instruction signal, said control unit controls to output the activation signal to the connected image capture apparatus via said first signal terminal.

13. An image capture apparatus, which is connectable to an accessory comprising an activation signal generation unit which generates an activation signal required to switch a connected image capture apparatus from a first state to a second state, said apparatus comprising:
a first signal terminal which is provided to an accessory shoe and is used to communicate with a connected accessory, a signal level of a signal going through said first signal terminal corresponding to information to be communicated via said first signal terminal;
a second signal terminal used to make a serial communication with the connected accessory, which is different from said first signal terminal; and
a state change unit configured to change a state of said image capture apparatus between the first state and the second state,
wherein said state change unit changes the state of said image capture apparatus to the second state when the activation signal is accepted via said first signal terminal in the first state,
wherein the first state is a state where the serial communication via the second signal terminal is not executable, and the second state is a state where the serial communication via the second signal terminal is executable,
wherein information indicating that the image capturing apparatus is capable of changing the state from the first state to the second state in response to the activation signal is transmitted to the connected accessory via the first signal terminal.

14. The apparatus according to claim 13, further comprising:
a communication unit which communicates with the connected accessory; and
a switching unit configured to enable the signal going through said first signal terminal for one of said state change unit and said communication unit,
wherein said switching unit enables the signal going through said first signal terminal for said communication unit in the second state, and enables the signal going through said first signal terminal for said state change unit in the first state.

15. The apparatus according to claim 13, further comprising:
a communication unit configured to communicate with the connected accessory; and
a switching unit configured to enable the signal going through said first signal terminal for one of said state change unit and said communication unit,
wherein when a predetermined condition is satisfied while the signal going through said first signal terminal is enabled for said communication unit, said switching unit enables the signal going through said first signal terminal for said state change unit, and when said state change unit accepts the activation signal while the signal going through said first signal terminal is enabled for said state change unit, said switching unit enables the signal going through said first signal terminal for said communication unit.

16. An accessory connectable to an image capture apparatus, comprising:
a serial communication signal terminal used to make a serial communication with a connected image capture apparatus;
a signal terminal which is electrically connected to a terminal provided to an accessory shoe of the connected image capture apparatus, and is not used for a serial communication with the connected image capture apparatus;

an activation signal generation unit configured to generate an activation signal required to switch the connected image capture apparatus from a serial communication disabled state to a serial communication enabled state;

a control unit configured to control to output the activation signal to the connected image capture apparatus via said signal terminal;

a determination unit configured to determine a type of the connected image capture apparatus by using said signal terminal, wherein when said determination unit determines that the connected image capture apparatus is a specific image capture apparatus, said control unit controls to output the activation signal to the connected image capture apparatus via said signal terminal.

17. An image capture apparatus connectable to an accessory, comprising:

a serial communication signal terminal used to make a serial communication with a connected accessory;

a signal terminal which is provided to an accessory shoe and is not used for a serial communication with the connected accessory; and a state change unit configured to change a state of said image capture apparatus between a serial communication disabled state and a serial communication enabled state, wherein when said state change unit accepts, via said signal terminal, an activation signal, which is generated by the accessory and is required to change the state of said image capture apparatus from the serial communication disabled state to the serial communication enabled state, in the serial communication disabled state, said state change unit changes the state of said image capture apparatus to the serial communication enabled state, wherein information indicating that the image capturing apparatus is capable of changing the state from the first state to the second state in response to the activation signal is transmitted to the connected accessory via the first signal terminal.

18. An image capture system comprising:

an image capture apparatus; and an accessory connectable to said image capture apparatus, said accessory comprising:

a first signal terminal which is electrically connected to a terminal provided to an accessory shoe of said image capture apparatus so as to communicate with said image capture apparatus, a signal level of a signal going through said first signal terminal corresponding to information to be communicated via said first signal terminal;

a second signal terminal used to make a serial communication with the connected image capture apparatus, which is different from said first signal terminal;

an activation signal generation unit configured to generate an activation signal required to change said image capture apparatus from a first state to a second state;

a control unit configured to control to output the activation signal to said image capture apparatus via said first signal terminal; and a determination unit configured to determine a type of the connected image capture apparatus by using said first signal terminal, wherein when said determination unit determines that the connected image capture apparatus is a specific image capture apparatus, said control unit controls to output the activation signal to the connected image capture apparatus via said first signal terminal, and said image capture apparatus comprising:

a state change unit configured to change a state of said image capture apparatus between the first state and the second state, wherein the first state is a state where a serial communication using the second signal terminal is not executable, and the second state is a state where a signal communication using the second signal terminal is executable, wherein said state change unit changes the state of said image capture apparatus to the second state when the activation signal is accepted via said first signal terminal in the first state, wherein information indicating that the image capturing apparatus is capable of changing the state from the first state to the second state in response to the activation signal is transmitted to the connected accessory via the first signal terminal.

19. An image capture system comprising:

an image capture apparatus; and an accessory connectable to said image capture apparatus, said accessory comprising:

a serial communication signal terminal used to make a serial communication with said image capture apparatus;

a signal terminal which is electrically connected to a terminal provided to an accessory shoe of said image capture apparatus, and is not used for a serial communication with said image capture apparatus;

an activation signal generation unit configured to generate an activation signal required to switch said image capture apparatus from a serial communication disabled state to a serial communication enabled state;

a control unit configured to control to output the activation signal to said image capture apparatus via said signal terminal; and a determination unit configured to determine a type of the connected image capture apparatus by using said signal terminal, wherein when said determination unit determines that the connected image capture apparatus is a specific image capture apparatus, said control unit controls to output the activation signal to the connected image capture apparatus via said signal terminal, and said image capture apparatus comprising:

a state change unit configured to change a state of said image capture apparatus between a serial communication disabled state and a serial communication enabled state, wherein when said state change unit accepts the activation signal via said signal terminal in the serial communication disabled state, said state change unit changes the state of said image capture apparatus to the serial communication enabled state, wherein information indicating that the image capturing apparatus is capable of changing the state from the first state to the second state in response to the activation signal is transmitted to the connected accessory via the first signal terminal.

* * * * *